(12) United States Patent
Bollinger et al.

(10) Patent No.: US 10,412,189 B2
(45) Date of Patent: Sep. 10, 2019

(54) CONSTRUCTING GRAPHS FROM ATTRIBUTES OF MEMBER PROFILES OF A SOCIAL NETWORKING SERVICE

(71) Applicant: Microsoft Technology Licensing, LLC, Redmond, WA (US)

(72) Inventors: Jacob Bollinger, Pacifica, CA (US); David Hardtke, Oakland, CA (US); Bo Zhao, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 537 days.

(21) Appl. No.: 14/953,943

(22) Filed: Nov. 30, 2015

(65) Prior Publication Data

US 2017/0060920 A1    Mar. 2, 2017

Related U.S. Application Data

(60) Provisional application No. 62/212,014, filed on Aug. 31, 2015.

(51) Int. Cl.
*H04L 29/08*    (2006.01)
*G06F 16/901*    (2019.01)
*H04W 4/21*    (2018.01)

(52) U.S. Cl.
CPC ........ *H04L 67/306* (2013.01); *G06F 16/9024* (2019.01); *H04W 4/21* (2018.02)

(58) Field of Classification Search
CPC combination set(s) only.
See application file for complete search history.

(56) References Cited

U.S. PATENT DOCUMENTS

| | | | | |
|---|---|---|---|---|
| 2012/0197993 | A1* | 8/2012 | Skomoroch | G06Q 30/02 709/204 |
| 2013/0204832 | A1* | 8/2013 | Juola | G06Q 10/04 706/48 |
| 2014/0074739 | A1* | 3/2014 | Rammohan | G06Q 10/1053 705/321 |
| 2014/0081928 | A1* | 3/2014 | Skomoroch | G06Q 30/02 707/692 |

(Continued)

*Primary Examiner* — Etienne P Leroux
(74) *Attorney, Agent, or Firm* — Schwegman Lundberg & Woessner, P.A.

(57) ABSTRACT

This disclosure is directed to determining various economic graph indices and, in particular, to systems and methods that leverage a graph analytic engine and framework to determine values assigned to graph nodes extracted from one or more member profiles, and visualizing said values to correlate skills, geographies, and industries. The disclosed embodiments include a client-server architecture where a social networking server has access to a social graph of its social networking members. The social networking server includes various modules and engines that import the member profiles and then extracts certain defined attributes from the member profiles, such as employer (e.g., current employer and/or past employers), identified skills, educational institutions attended, and other such defined attributes. Using these attributes as nodes, the social networking server constructs a graph using various graph processing techniques. The resulting graph is then used to correlate and rank the various attributes that define the graph.

17 Claims, 16 Drawing Sheets

(56) References Cited

U.S. PATENT DOCUMENTS

| | | | | |
|---|---|---|---|---|
| 2014/0244531 A1* | 8/2014 | Baldwin | ............ | G06Q 10/1053 705/319 |
| 2014/0280532 A1* | 9/2014 | MacNiven | ............ | H04L 67/306 709/204 |
| 2015/0213370 A1* | 7/2015 | Chakrabarti | ........... | G06Q 50/01 706/52 |
| 2015/0331866 A1* | 11/2015 | Shen | ................. | G06F 17/30861 707/723 |
| 2016/0342636 A1* | 11/2016 | Braghin | ................ | G06F 9/5055 |

* cited by examiner

CONSTRUCTING GRAPHS FROM ATTRIBUTES OF MEMBER PROFILES OF A SOCIAL NETWORKING SERVICE

CROSS-REFERENCE TO RELATED APPLICATIONS

This application claims the benefit of priority to U.S. Pat. App. No. 62/212,014, titled "SYSTEMS AND METHODS FOR CONSTRUCTING GRAPHS FROM ATTRIBUTES OF MEMBER PROFILES OF A SOCIAL NETWORKING SERVICE" and filed Aug. 31, 2015, the disclosure of which is incorporated by reference herein in its entirety.

TECHNICAL FIELD

The subject matter disclosed herein generally relates to systems and methods for determining various economic graph indices and, in particular, to systems and methods that leverage a graph analytic engine and framework to determine values assigned to graph nodes extracted from one or more member profiles, and visualizing said values to correlate skills, geographies, and industries.

BACKGROUND

Online social networking services provide users with a mechanism for defining, and memorializing in a digital format, their relationships with other people. This digital representation of real-world relationships is frequently referred to as a social graph. Many social networking services utilize a social graph to facilitate electronic communications and the sharing of information between its users or members. For instance, the relationship between two members of a social networking service, as defined in the social graph of the social networking service, may determine the access and sharing privileges that exist between the two members. As such, the social graph in use by a social networking service may determine the manner in which two members of the social networking service can interact with one another via the various communication and sharing mechanisms supported by the social networking service.

One of the challenges facing industries and cities today is retaining talented individuals and employees. In particular, a city may produce talented individuals, but if it fails to retain those individuals, that city is less likely to develop an industry corresponding to the individuals' talents. For example, cities in Nebraska or Iowa may be producing talented computer engineers and scientists, but these individuals are moving to San Jose, Calif. and other parts of "Silicon Valley" as Nebraska and Iowa do not have the same industrial base as Silicon Valley. Knowing where individuals are being drawn to, and in what industries, can help city and state planners better understand the economic landscape, and formulate policies that retain these talented individuals and generate industries geared toward their talents.

BRIEF DESCRIPTION OF THE DRAWINGS

Some embodiments are illustrated by way of example and not limitation in the figures of the accompanying drawings.

DETAILED DESCRIPTION

Figure 1:
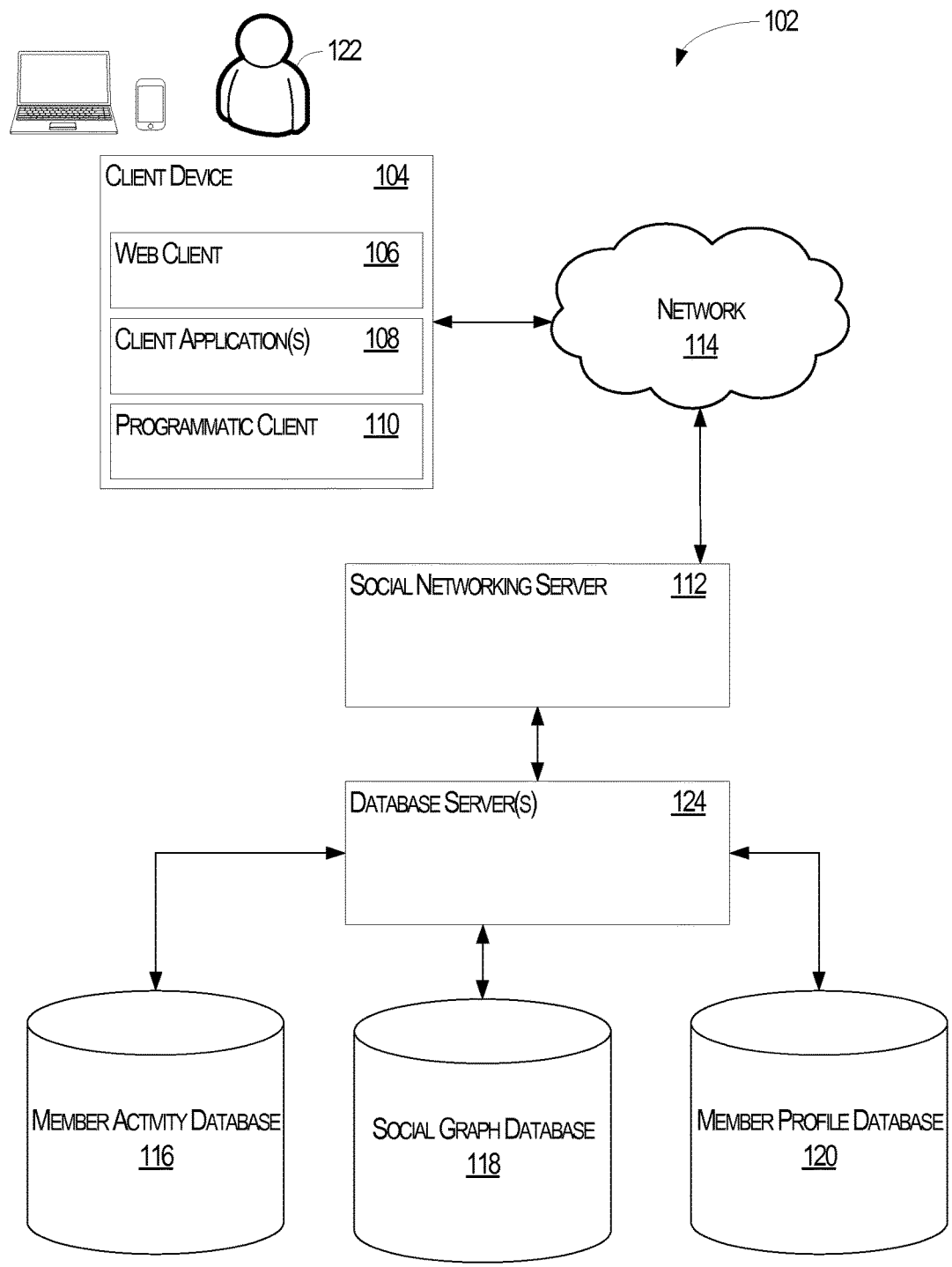
FIG. 1 is a block diagram illustrating a networked system, according to some example embodiments.

Example methods and systems are directed to determining various economic graph indices and, in particular, to systems and methods that leverage a graph analytic engine and framework to determine values assigned to graph nodes extracted from one or more member profiles, and visualizing said values to correlate skills, geographies, and industries. The disclosed embodiments include a client-server architecture where a social networking server has access to a social graph of its social networking members. The social networking server includes various modules and engines that import the member profiles and then extracts certain defined attributes from the member profiles, such as employer (e.g., current employer and/or past employers), identified skills, educational institutions attended, and other such defined attributes.

Using the extracted attributes, the social networking server constructs a graph, where the nodes of the graph are the extracted attributes. In an alternative embodiment, the social networking server constructs multiple graphs, where each graph includes specified attributes as the nodes. As an example of such a graph, the graph may include a first set of nodes corresponding to current employers, a second set of nodes corresponding to members (e.g., member profiles), and a third set of nodes corresponding to educational institutions attended. Edges of the graph may be established between specified types of nodes, e.g., between employers and members and between members and educational institutions attended.

The values of the nodes may be undefined when the graph is first constructed and/or initialized. In one embodiment, a first set of nodes are specified as the primary nodes, e.g., nodes that are assigned a value before other nodes in the graph. In this embodiment, the nodes corresponding to current employers (e.g., "current employer nodes") are assigned their values first. The social networking server is configured with a graph construction module and graph analytic engine that applies the values to the current employer nodes and then uses one or more label propagation techniques to assign values to other connected nodes. In one embodiment, and as discussed below, the values assigned to other connected nodes is derived from values and/or equations assigned to edges connecting the nodes.

As an example of values applied to the current employer nodes, the social networking server leverages previously determined market capitalizations of the current employers, and then determines a market capitalization per employee (MCPE) for each of the current employers. The MCPE is then assigned the value of corresponding current employer nodes, and then the graphic analytic engine is invoked to propagate values to other connected nodes. When this is performed for each set of nodes (e.g., educational institution nodes, skills nodes, geographical nodes, etc.), the social networking server is able to consolidate various nodes into supersets (e.g., one or more geographical regions, one or more industries, etc.), and generate reports showing the correlation between the various supersets. In this manner, the disclosed systems and methods merge technological, mathematical, and economic disciplines to provide a deep understanding of how talent, skills, and industries, are shifting and developing in today's global economy.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

With reference to FIG. 1, an example embodiment of a high-level client-server-based network architecture 102 is shown. An social networking server 112 provides server-side functionality via a network 124 (e.g., the Internet or wide area network (WAN)) to one or more client devices 104. FIG. 1 illustrates, for example, a web client 106 (e.g., a browser, such as the Internet Explorer® browser developed by Microsoft® Corporation of Redmond, Wash. State), an application 108, and a programmatic client 110 executing on client device 104. The social networking server 112 is further communicatively coupled with one or more database servers 124 that provide access to one or more databases 116-120.

The client device 104 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, or any other communication device that a user 122 may utilize to access the social networking server 112. In some embodiments, the client device 104 may comprise a display module (not shown) to display information (e.g., in the form of user interfaces). In further embodiments, the client device 104 may comprise one or more of a touch screens, accelerometers, gyroscopes, cameras, microphones, global positioning system (GPS) devices, and so forth. The client device 104 may be a device of a user 122 that is used to perform one or more searches for user profiles accessible to, or maintained by, the social networking server 112.

In one embodiment, the social network server 112 is a network-based appliance that responds to initialization requests or search queries from the client device 104. One or more users 122 may be a person, a machine, or other means of interacting with client device 104. In various embodiments, the user 122 is not part of the network architecture 102, but may interact with the network architecture 102 via the client device 104 or another means. For example, one or more portions of network 114 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 104 may include one or more applications (also referred to as "apps") such as, but not limited to, a web browser, messaging application, electronic mail (email) application, a social networking access client, and the like. In some embodiments, if the social networking access client is included in the client device 104, then this application is configured to locally provide the user interface and at least some of the functionalities with the application configured to communicate with the social networking server 112, on an as needed basis, for data and/or processing capabilities not locally available (e.g., access to a member profile, to authenticate a user 122, to identify or locate other connected members, etc.). Conversely if the social networking server access client is not included in the client device 104, the client device 104 may use its web browser to access the initialization and/or search functionalities of the social networking server 112.

One or more users 122 may be a person, a machine, or other means of interacting with the client device 104. In example embodiments, the user 122 is not part of the network architecture 102, but may interact with the network architecture 102 via the client device 104 or other means. For instance, the user 122 provides input (e.g., touch screen input or alphanumeric input) to the client device 104 and the input is communicated to the networked system 102 via the network 114. In this instance, the social networking server 112, in response to receiving the input from the user 122, communicates information to the client device 104 via the network 114 to be presented to the user 122. In this way, the user 122 can interact with the social networking server 112 using the client device 104.

Further, while the client-server-based network architecture 102 shown in FIG. 1 employs a client-server architecture, the present subject matter is of course not limited to such an architecture, and could equally well find application in a distributed, or peer-to-peer, architecture system, for example.

In addition to the client device 104, the social networking server 112 communicates with other one or more database server(s) 124 and/or database(s) 116-120. In one embodiment, the social networking server 112 is communicatively coupled to a member activity database 116, a social graph database 118, and a member profile database 120. The databases 116-120 may be implemented as one or more types of databases including, but not limited to, a hierarchical database, a relational database, an object-oriented database, a graph database, one or more flat files, or combinations thereof. Examples of graph databases include, but are not limited to, Neo4j, which is available from Neo Technology, Inc., Giraph, which is available from The Apache Software Foundation, and GraphLab, which is available from Dato, Inc.

The member profile database 120 stores member profile information about members who have registered with the social networking server 112. Consistent with some embodiments, when a person initially registers to become a member of the social networking service provided by the social networking server 112, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the member profile database 120. Similarly, when a representative of an organization initially registers the organization with the social networking service provided by the social networking server 112, the representative may be prompted to provide certain information about the organization. This information may be stored, for example, in the member profile database 120. With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Members of the social networking service provided by the social networking server 112 may establish connections with one or more members and/or organizations of the social networking service. The connections may be defined as a social graph, where the member and/or organization is representative by a node in the social graph and the edges identify connections between nodes. In this regard, the edges may be bilateral (e.g., two members and/or organizations have agreed to form a connection), unilateral (e.g., one member has agreed to form a connection with another member), or combinations thereof. In this manner, members are said to be first-degree connections where a single edge connects the nodes representing the members; otherwise, members are said to be "nth"-degree connections where "n" is defined as the number of edges separating two nodes. As an example, two members are said to be "2nd-degree" connections where each of the members share a connection in common, but are not directly connected to one another. In one embodiment, the social graph maintained by the social networking server 112 is stored in the social graph database 118.

Although the foregoing discussion refers to "social graph" in the singular, one of ordinary skill in the art will recognize that the social graph database 118 may be configured to store multiple social graphs. For example, and without limitation, the social networking server 112 may maintain multiple social graphs, where each social graph corresponds to various geographic regions, industries, members, or combinations thereof. As discussed below, in generating the various indices, the social networking server 112 may be configured to generate a single graph or multiple graphs.

As members interact with the social networking service provided by the social networking server 112, the social networking server 112 is configured to monitor these interactions. Examples of interactions include, but are not limited to, commenting on content posted by other members, viewing member profiles, editing or viewing a member's own profile, sharing content outside of the social networking service (e.g., an article provided by an entity other than the social networking server 112), updating a current status, posting content for other members to view and/or comment on, and other such interactions. In one embodiment, these interactions are stored in a member activity database 116, which associates interactions made by a member with his or her member profile stored in the member profile database 120.

In one embodiment, the social networking server 112 communicates with the various databases 116-120 through one or more database server(s) 124. In this regard, the database server(s) 124 provide one or more interfaces and/or services for providing content to, modifying content, removing content from, or otherwise interacting with the databases 116-120. For example, and without limitation, such interfaces and/or services may include one or more Application Programming Interfaces (APIs), one or more services provided via a Service-Oriented Architecture ("SOA"), one or more services provided via a REST-Oriented Architecture ("ROA"), or combinations thereof. In an alternative embodiment, the social networking server 112 communicates with the databases 116-120 and includes a database client, engine, and/or module, for providing data to, modifying data stored within, and/or retrieving data from, the one or more databases 116-120.

One of ordinary skill in the art will recognize that the database server(s) 124 may include one or more different types of servers. For example, the database server(s) 124 may include a Microsoft® Exchange Server, a Microsoft® Sharepoint® Server, a Lightweight Directory Access Protocol ("LDAP") server, any other server configured to provide user profile information, or combinations thereof. Accordingly, and in one embodiment, the servers in communication with the social networking server 112 are configured to access the various databases 116-120 and retrieve or store corresponding information.

Figure 2:
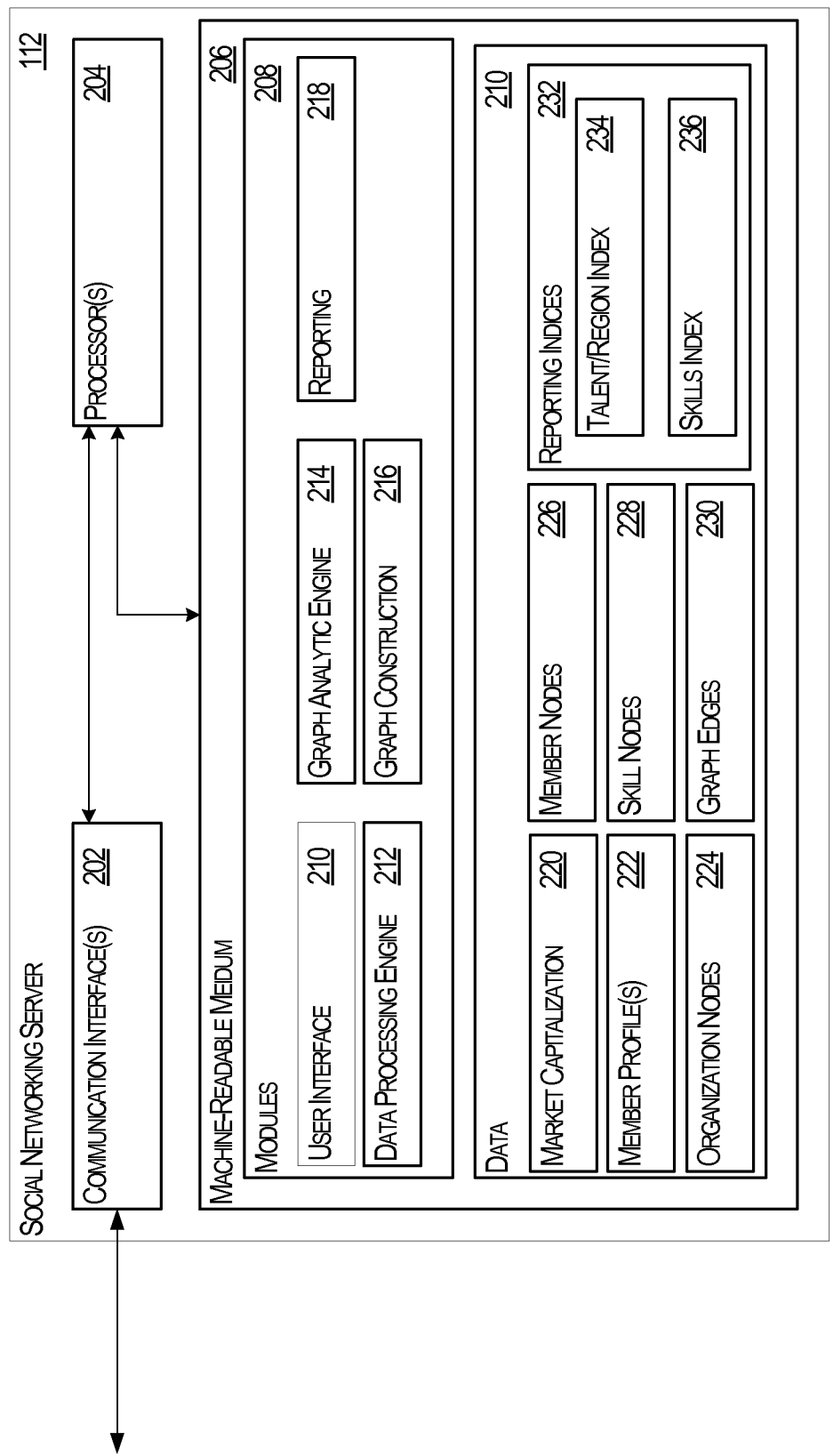
FIG. 2 illustrates the social networking server of FIG. 1, according to an example embodiment.

FIG. 2 illustrates the social networking server 112 of FIG. 1 in accordance with an example embodiment. In one embodiment, the social networking server 112 includes one or more processor(s) 204, one or more communication interface(s) 202, and a machine-readable medium 206 that stores computer-executable instructions for one or more modules(s) 208 and data 210 used to support one or more functionalities of the modules 208.

The various functional components of the social networking server 112 may reside on a single device or may be distributed across several computers in various arrangements. The various components of the social networking server 112 may, furthermore, access one or more databases (e.g., databases 116-120 or any of data 210), and each of the various components of the social networking server 112 may be in communication with one another. Further, while the components of FIG. 2 are discussed in the singular sense, it will be appreciated that in other embodiments multiple instances of the components may be employed.

The one or more processors 204 may be any type of commercially available processor, such as processors available from the Intel Corporation, Advanced Micro Devices, Texas Instruments, or other such processors. Further still, the one or more processors 204 may include one or more special-purpose processors, such as a Field-Programmable Gate Array (FPGA) or an Application Specific Integrated Circuit (ASIC). The one or more processors 204 may also include programmable logic or circuitry that is temporarily configured by software to perform certain operations. Thus, once configured by such software, the one or more processors 204 become specific machines (or specific components of a machine) uniquely tailored to perform the configured functions and are no longer general-purpose processors.

The one or more communication interfaces 202 are configured to facilitate communications between the social networking server 112, the client device 104, and one or more of the database server(s) 124 and/or database(s) 116-120. The one or more communication interfaces 202 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combination of such wired and wireless interfaces.

The machine-readable medium 206 includes various modules 208 and data 210 for implementing the organizational directory server 112. The machine-readable medium 206 includes one or more devices configured to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the modules 208 and the data 210. Accordingly, the machine-readable medium 206 may be implemented as a single storage apparatus or device, or, alternatively and/or additionally, as a "cloud-based" storage systems or storage networks that include multiple storage apparatus or devices. As shown in FIG. 2, the machine-readable medium 206 excludes signals per se.

In one embodiment, the modules 208 are written in a computer-programming and/or scripting language. Examples of such languages include, but are not limited to, C, C++, C#, Java, JavaScript, Perl, Python, or any other computer programming and/or scripting language now known or later developed.

With reference to FIG. 2, the modules 208 of the social networking server 112 include, but are not limited to, a user interface module 210, a data processing engine 212, a graph analytic engine 214, a graph construction module 216, and a reporting module 218. The data 210 supporting these modules 208 include, but is not limited to, a market capitalization data 220, one or more member profiles 222, one or more different sets of graph nodes 224-228, data defining one more edges 230 between the nodes 224-228, and one or more reporting indices 232, including, but not limited to, a talent/region index 234 and a skills index 236, for example.

The user interface module 210 is configured to provide access to, and interactions with, the social networking server 112. In one embodiment, the user interface module 210 provides one or more graphical user interfaces, which may be provided using the Hypertext Transfer Protocol (HTTP). The graphical user interfaces are displayable by the client device 104 and accept input from the user 122 for interacting with the social networking server 112. Further still the user interface module 210 may be configured to provide such interfaces to one or more clients displayable by the client device 104, such as the web client 106, one or more client applications 108, or the programmatic client 110. By interacting with the user interface module 210, the user 122 can instruct the social networking server 122 to generate one or more indices according to one or more selected attributes, such as geography, education, skills, industry, or other selected attributes or combinations of attributes. Further still, the user interface module 210 are configured to generate a display of one or more indices prepared by the social networking server 112, such as the talent/region index 234, the skills index 236, or any other such index.

The data processing engine 212 is configured process data retrieved from one or more of the databases 116-120. In addition, the data processing engine 212 provides a platform in which one or more of the other modules 208 are instantiated, such as the graph construction module 218, the graph analytic engine 214, and/or the reporting module 218. In one embodiment, the data processing engine 212 is implemented as Apache Spark™, which is available from the Apache Software Foundation. As known to one of ordinary skill in the art, Apache Spark™ is an open-source cluster computing framework that includes various modules and APIs for streaming, Structured Query Language (SQL), machine learning and graph processing. Further still, and in one embodiment, the data processing engine 212 is configured to retrieve data from one or more of the databases 116-120 including, but not limited, one or more member profiles from the member profile database 120 and one or more social graphs from the social graph database 118. The member profiles retrieved from the member profile database 120 are stored as the member profile(s) 222. As discussed below with reference to the graph construction module 218 and the graph analytic engine 214, the data processing engine 212 may be further configured to extract particular attributes from one or more of the retrieved member profiles 222 or one or more of the retrieved social graphs.

The graph construction module 216 is configured to construct a graph from the data retrieved by the data processing engine 212. In one embodiment, the graph construction module 216 is implemented as GraphX. As one of ordinary skill in the art would understand, GraphX is a set of APIs available through Apache Spark™ that provide for exploratory analysis, construction, and iterative graph computations. The graph construction module 216 is configured to construct one or more graphs from data representing one or more nodes and/or one or more edges. In one embodiment, the graph construction module 216 constructs the one or more graphs based on the data retrieved by the data processing engine 214 including, but not limited to, the retrieved member profiles 222 and attributes extracted from the member profiles. The attributes extracted from the retrieved member profiles 222 include, but are not limited to, organizations associated with a given member (e.g., a current employer and any educational institutions previously attended), one or more skills (e.g., "writing," "programming," "painting," "graphic design," etc.), geographic information (e.g., a location associated with the current employer attribute), and other any other such attributes associated with the retrieved member profiles 222.

In one embodiment, the graph construction module 216 defines the nodes of one or more graphs as each of the attributes extracted from the retrieved member profiles 222. For example, the graph construction module 216 may define organization nodes 224 from the extracted organizational attributes, member nodes 226 that each correspond to the member profiles 222, skill nodes 228 from the extracted skill attributes, geographic nodes (not shown) from extracted geographic attributes (e.g., where an employer is located or where an educational institution is located), and other such nodes or combination of nodes.

Figure 3:
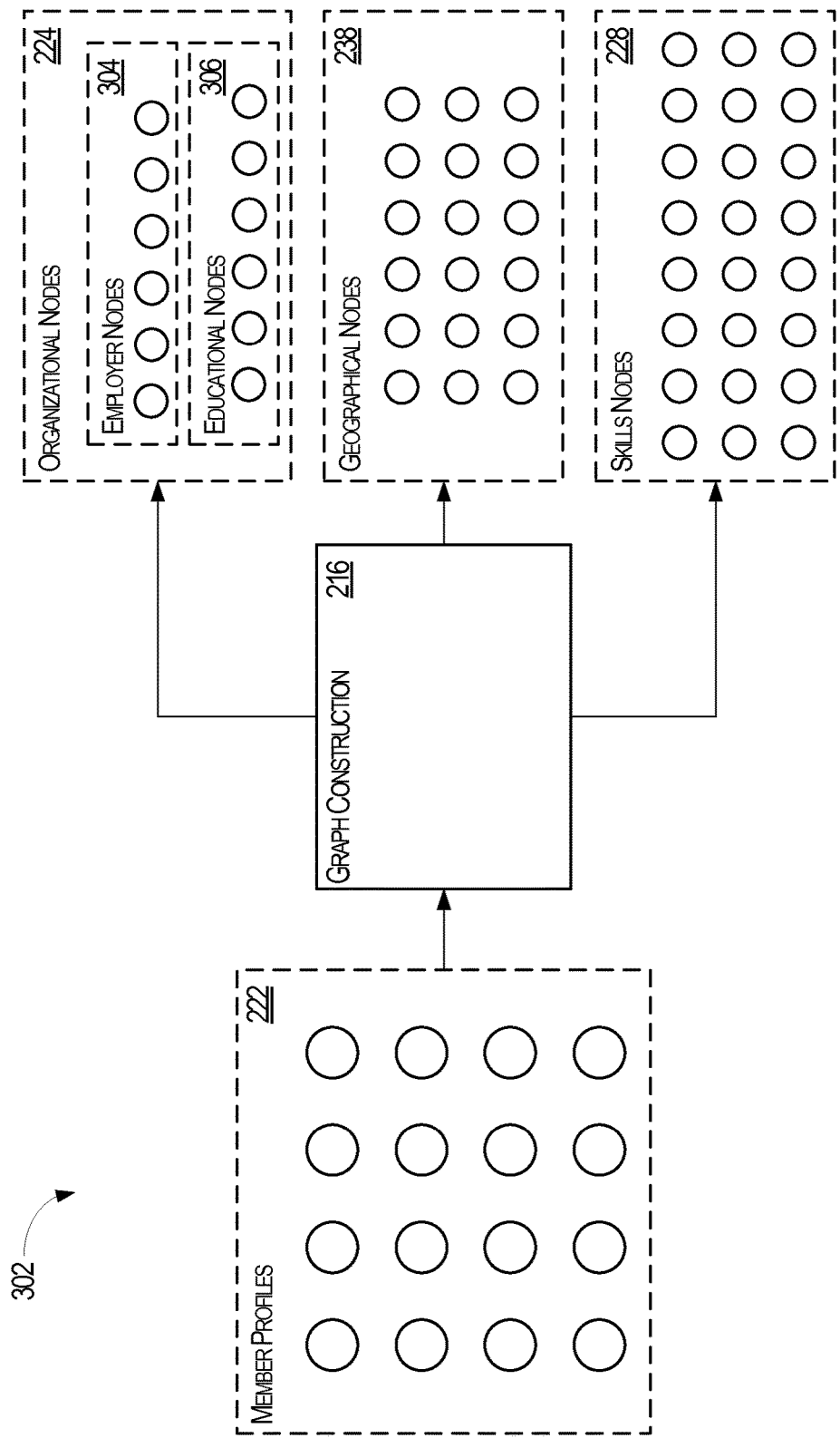
FIG. 3 illustrates an example embodiment of defining graph nodes given one or more member profiles associated with the social networking server of FIG. 1.

FIG. 3 illustrates an example embodiment 302 of defining graph nodes given one or more member profiles associated with the social networking server of FIG. 1. As shown in FIG. 3, the one or more retrieved member profiles 222 are provided as input to the graph construction module 216. In one embodiment, for each of the attributes and/or fields defined by the retrieved member profiles 222, the graph construction module 216 defines corresponding organizational nodes 224, the geographical nodes 238, and the skills nodes 228. In addition, the organizational nodes 224 may include one or more employers (e.g., a current employer and/or past employers) associated with a given member profile and one or more educational institutions (e.g., a current educational institution and/or previously attended educational institutions). Accordingly, the organizational nodes 224 may include one or more employer nodes 304 and one or more educational nodes 306. Thusly, each defined member node may be associated with one or more organizational nodes 224, one or more skills nodes 228, one or more geographical nodes 238, and any other type of node extracted from the attributes of the retrieved member profile(s) 222.

In addition, the graph construction module 216 is configured to define one or more graph edges 230 between one or more of the nodes 224-228. In one embodiment, the graph edges 230 are defined relative to the member nodes 226. In other words, in this embodiment, the member nodes 226 are central nodes and the other nodes (e.g., the organization nodes 224 and the skill nodes 228) are defined with edges with them. Accordingly, in this embodiment, there may be sets of nodes where there are no edges, e.g., between the organization nodes 224 and the skill nodes 228. In alternative embodiments, different sets of nodes 224-228 have different sets of edges 230. In addition, there may be a configuration where a single graph is defined and each of the nodes of the graph are interconnected by one or more edges. Further still, the graph edges 230 may define edges for multiple sets of graphs, where each graph includes specific sets of nodes 224-228.

Figure 4:
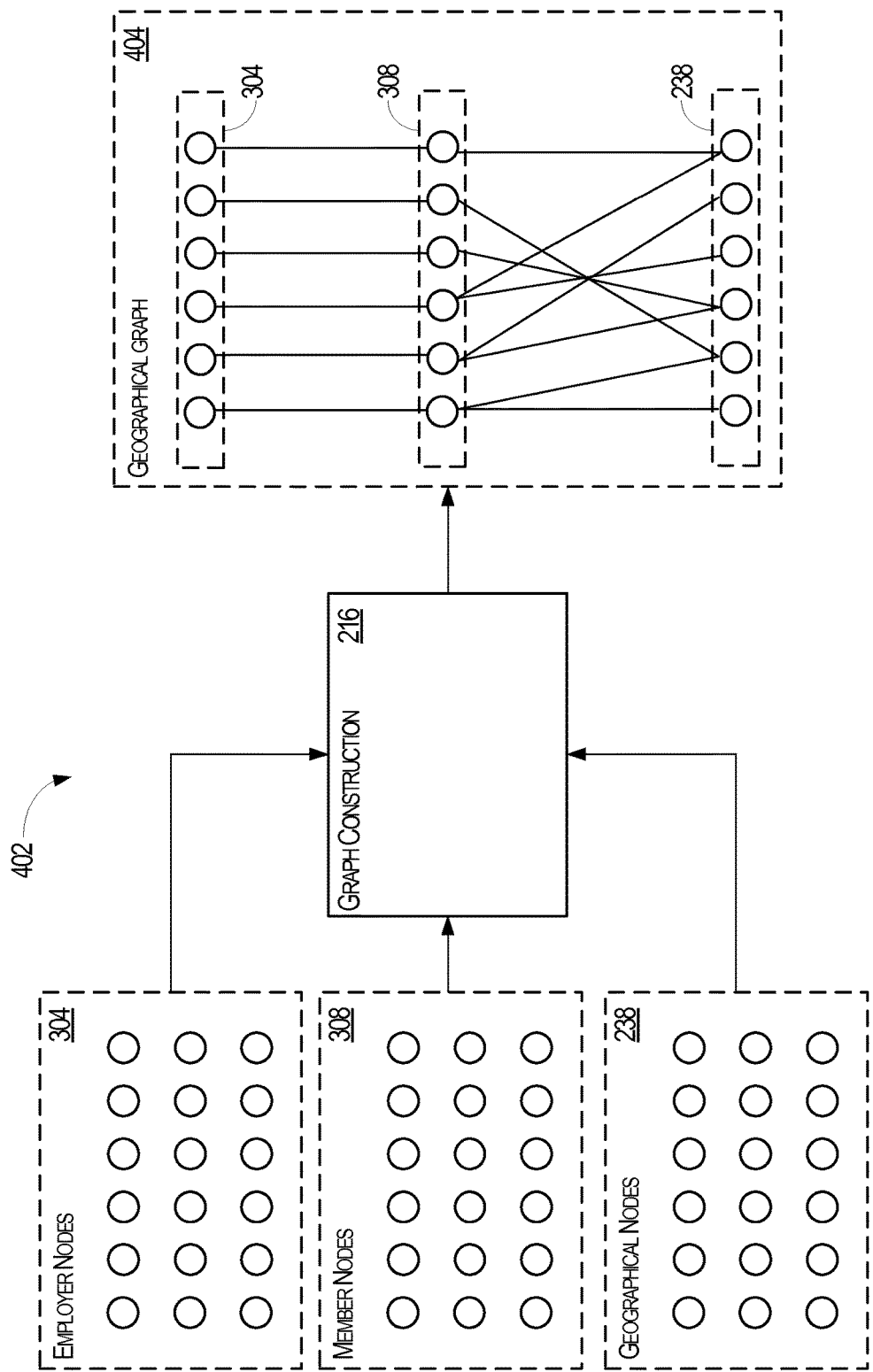
FIGS. 4-6 illustrate constructing various types of graphs, in accordance with example embodiments, using the defined graph nodes of FIG. 3.
Figure 5:
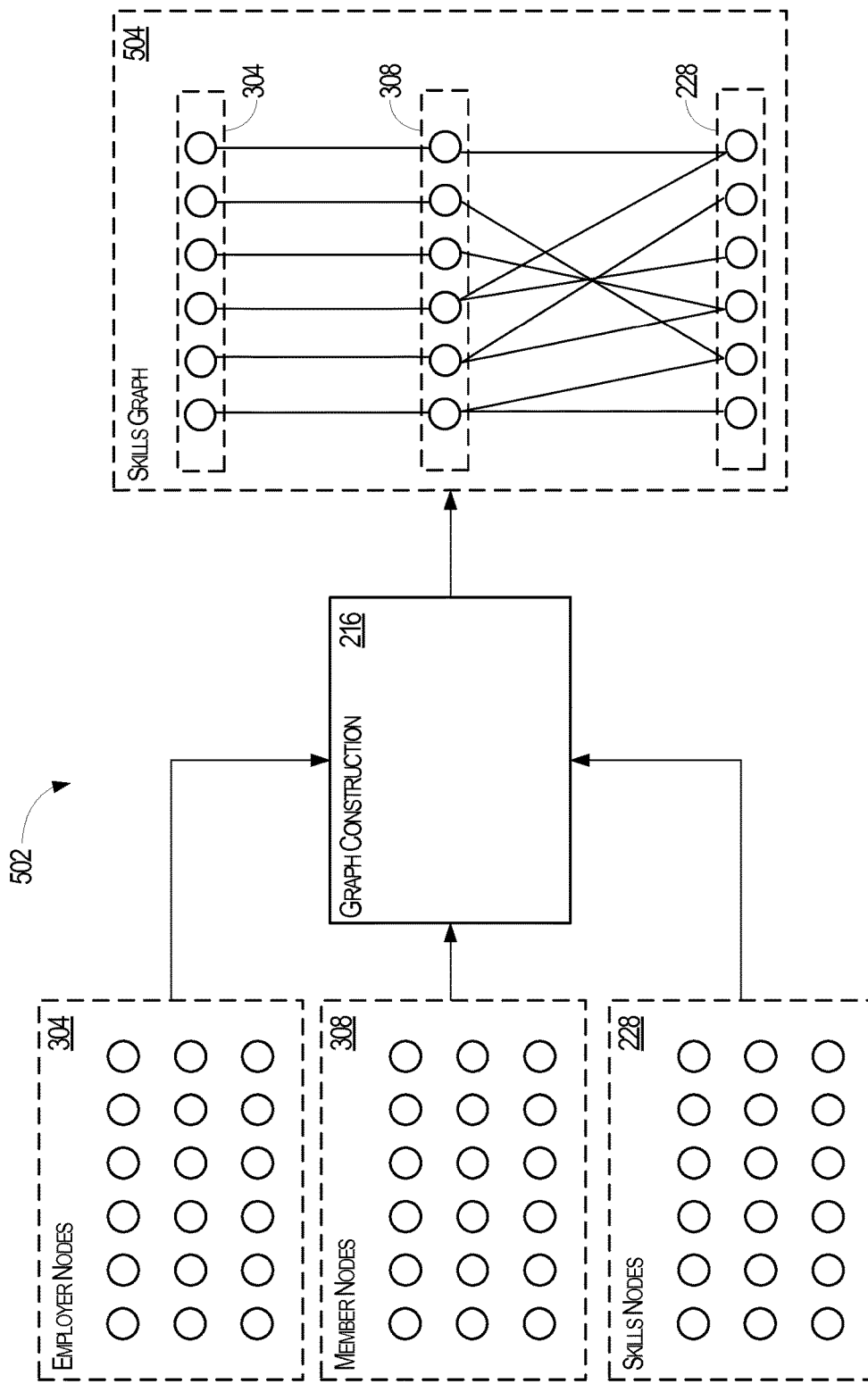
Figure 6:
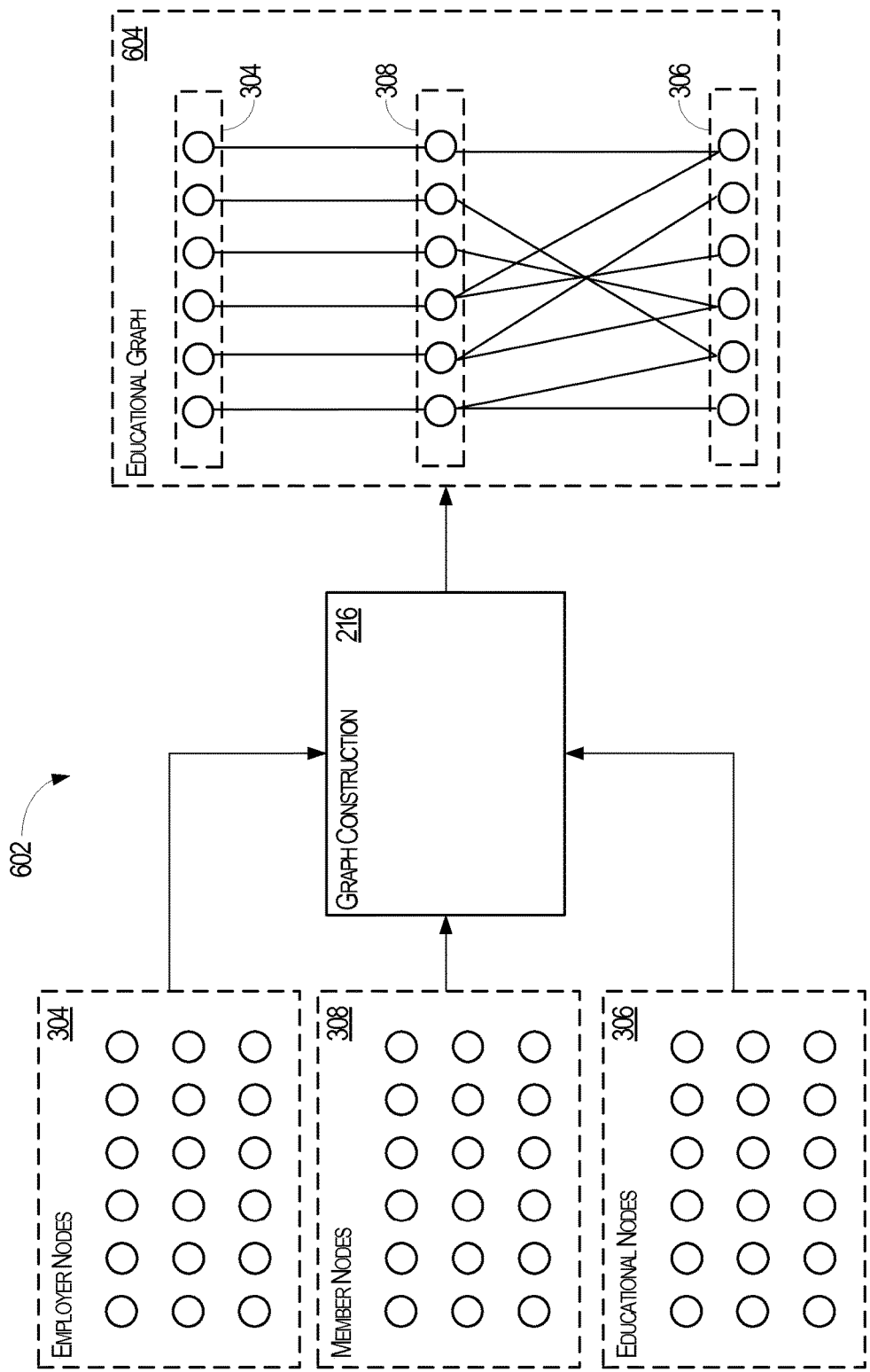

FIGS. 4-6 illustrate constructing various types of graphs, in accordance with example embodiments, based on the defined graph nodes of FIG. 3. FIG. 4 illustrates an example embodiment 402 of constructing a geographical graph 404 from the defined employer nodes 304, the member nodes 308, and one or more geographical nodes 238. As shown in FIG. 4, the employer nodes 304 are connected by one or more edges to the member nodes 308, and the member nodes 308 are connected by one or more edges to the geographical nodes 238. FIG. 5 illustrates an example embodiment 502 of constructing a skills graph 504 from the defined employer nodes 304, the member nodes 308, and the skills nodes 228. As shown in FIG. 5, the employer nodes 304 are connected by one or more edges to the member nodes 308, and the member nodes 308 are connected by one or more edges to the skills nodes 228. Finally, FIG. 6 illustrates an example embodiment 602 of constructing an educational graph 604 from the defined employer nodes 304, the member nodes 308, and the educational nodes 306. As shown in FIG. 6, the employer nodes 304 are connected by one or more edges to the member nodes 308, and the member nodes 308 are connected by one or more edges to the educational nodes 306.

While FIGS. 4-6 illustrate different types of graphs, one of ordinary skill in the art will understand that a single graph may be constructed alternatively, or in addition to, the individual graphs. In this regard, and in one embodiment, the single graph includes a first set of edges defined between the employer nodes 304 and the member nodes 308, and then a second set of edges between the member nodes 308 and one or more of the geographical nodes 238, skills nodes 228, or educational nodes 306.

Figure 7:
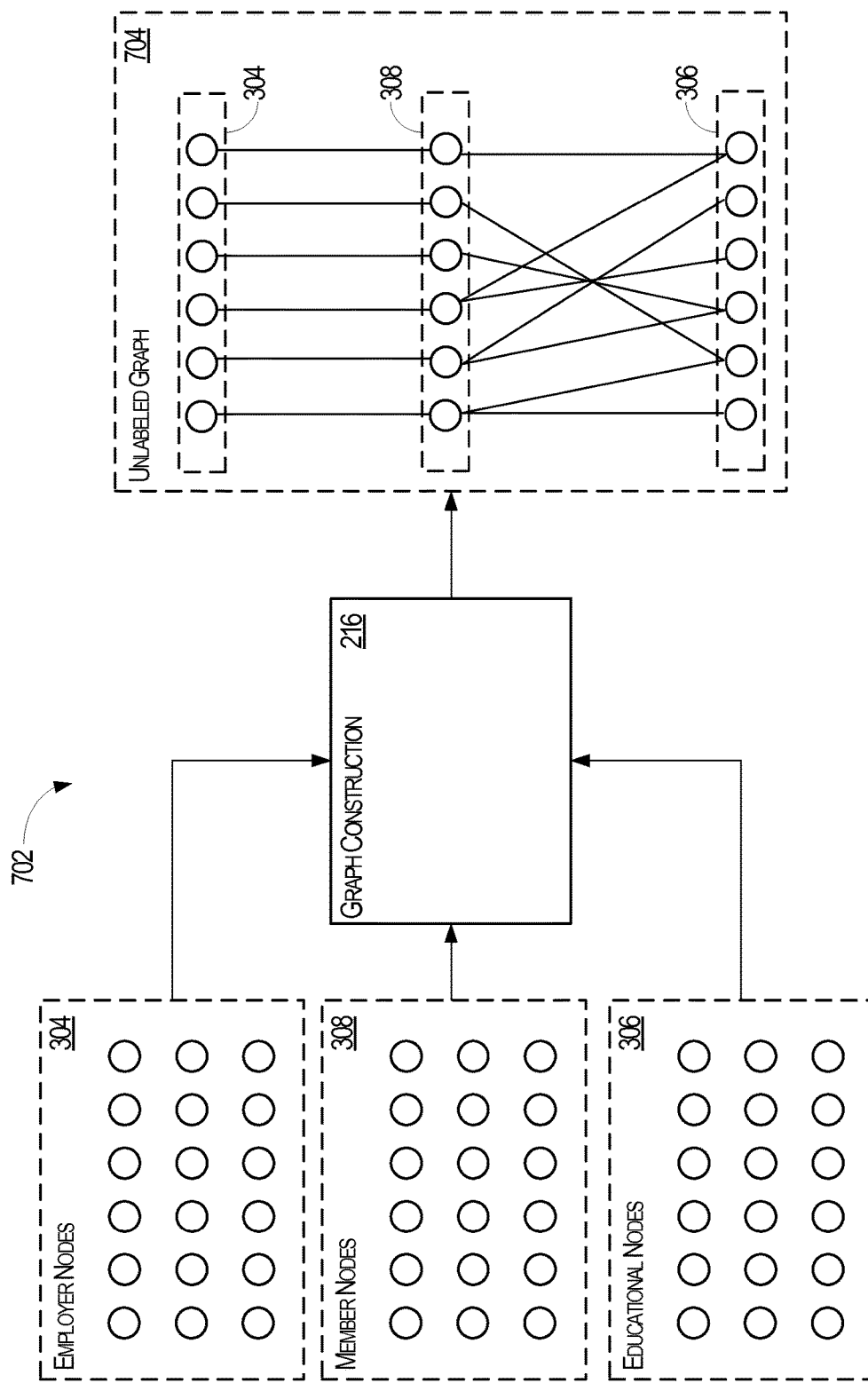
FIG. 7 illustrates an unlabeled graph constructed from the defined graph nodes of FIG. 3, in accordance with an example embodiment.

FIG. 7 illustrates an unlabeled graph 704 constructed from the defined graph nodes 304-306 of FIG. 3, in accordance with an example embodiment 702. As shown in FIG. 7, the unlabeled graph 704 is constructed from the employer nodes 304, the member nodes 308 and the educational nodes 306 via the graph construction module 216. In addition, each of the nodes 304-306 are associated with various attributes, such as one or more skills attributes, one or more geographical attributes, and, as discussed below with reference to FIG. 8, a value attribute that indicates the value of a given node. In one embodiment, this value attribute is represented as a market cap per employee value determined from an employer's revenue (e.g., gross revenue, net profit, etc.) and the number of employees employed by the corresponding employer. The graph 704 is considered "unlabeled" because, after this initial construction phase, a majority of the nodes are associated with a corresponding value attribute that is NULL. As discussed below with reference to FIGS. 8-12, a label propagation technique may be used to assign a value to the value attribute associated with a corresponding node for each of the employer nodes 304, educational nodes 306, and member nodes 308.

A single graph may be defined rather than individual types of graphs for resource management purposes, e.g., a single graph may require less memory and/or processing cycles to implement rather than individual types of graphs. However, individual types of graphs may be preferable, in some instances, for organizational and/or transformation purposes.

The graph analytic engine 214 is configured to determine values for one or more nodes 224-228 and one or more edges 230 for one or more graphs of the graphs constructed by the graph construction module 216. In this regard, the graph analytic engine 214 may be configured as an extension to GraphX or may be a standalone module configured to receive inputs from, and provide outputs to, the data processing engine 212 and/or the graph construction module 216.

In one embodiment, when the nodes 224-228 are initially defined, the nodes 224-228 lack an assigned value. As discussed below with regard to FIG. 13, the values of the nodes 224-228 are used in preparing the reporting indices 232. As the reporting indices 232 are intended to highlight and correlate the economic value in various industries, regions, skills, etc., market capitalization for the organizations associated with the member profiles 222 becomes a proxy for this economic value. In particular, the value of "market cap. per employee" (MCPE) for each of the organization nodes 224 becomes the base value by which the value of other nodes (e.g., member nodes 226, skill nodes 228, geographic nodes, etc.) are determined. In one embodiment, MCPE is determined by dividing market capitalization for a given organization with the number of employees employed by the organization. The social networking server 112 may receive the market capitalization data 220 from a number of sources including, but not limited to, the New York Stock Exchange (NYSE), The NASDAQ Stock Market, from the London Stock Exchange, or any other provider of market capitalization information, or combination of such providers.

Figure 8:
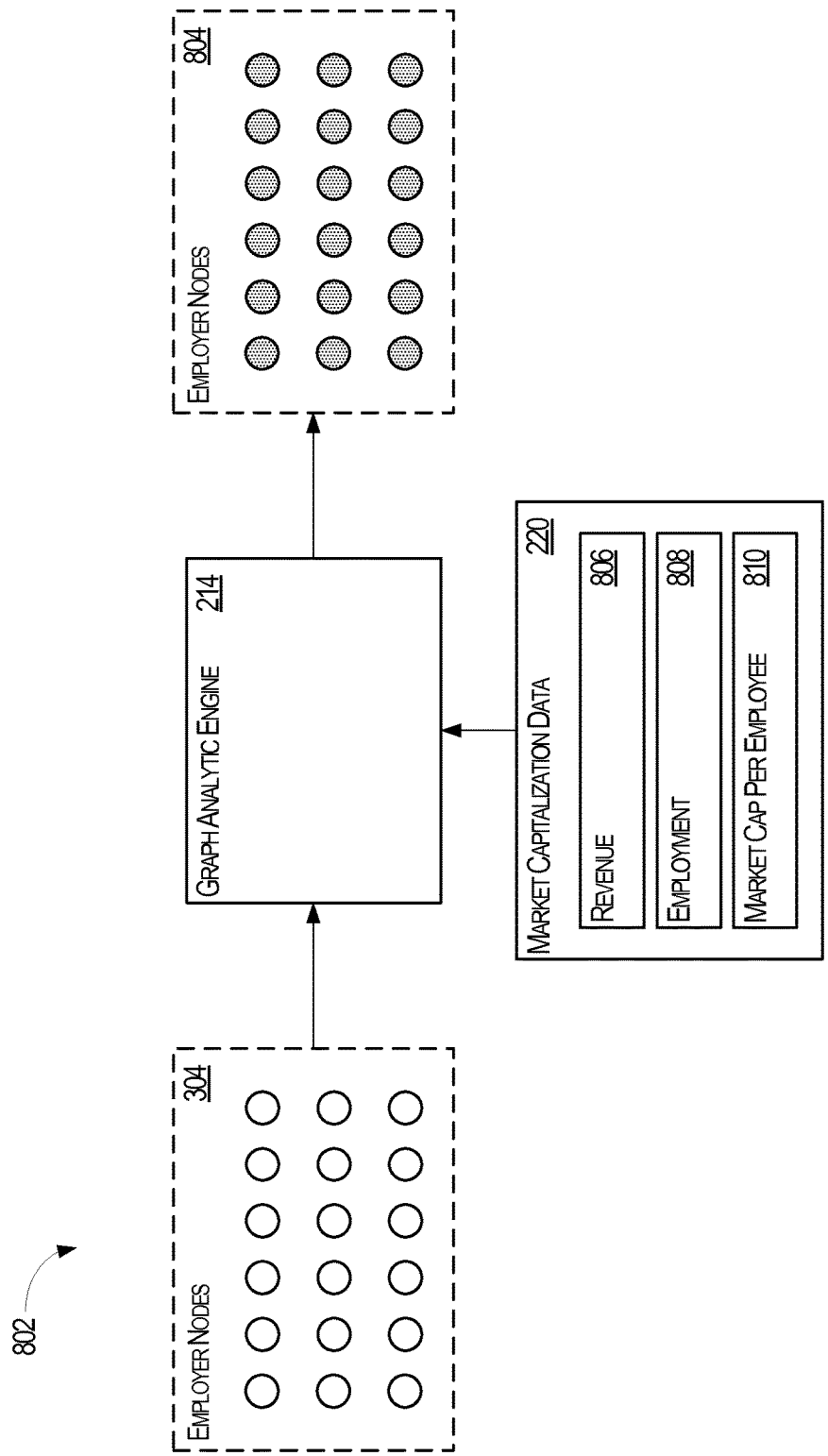
FIG. 8 illustrates assigning values to organization nodes, in accordance with an example embodiment.

FIG. 8 illustrates assigning values to organization nodes in accordance with an example embodiment 802. As shown in FIG. 8, the graph analytic engine 214 is provided with the market capitalization data 220 for each of the employers defined by the employer nodes 304. Where market capitalization data 220 is unavailable for a given employer, that employer may be omitted from the set of employer nodes 304.

In one embodiment, the market capitalization data 220 includes revenue data 806, employment data 808, and the MCPE data 810. The revenue data 806 may specify the amount of revenue a given employer brings in per year (e.g., gross revenue and/or net revenue). The employment data 808 may specify the number of employees employed by the given employer. Finally, the MCPE data 810 indicates the MCPE for a given employer based on the revenue data 806 and the employment data 808. In some instances, the market capitalization data 220 includes alternative or additional sets of data elements, which are then leveraged by the graph analytic engine 214 in assigning values to the employer nodes 304. As shown in FIG. 8, after assigning the MCPE values to the employer nodes 304, the employer nodes are transformed into the employer nodes 804, where the employer nodes 804 have an assigned value corresponding to their determined MCPE. In this manner, the graph analytic engine 214 determines the initial set of values for the employer nodes 304 defined by the graph construction module 216.

In addition to the determined MCPE values for the organization nodes 224, the graph analytic engine 214 also assigns values to other nodes connected to the organization nodes 224 based on defined equations assigned to the edges (e.g., graph edges 230) connecting the organization nodes 224 with the other nodes. In one embodiment, the defined equation of the edges is the square of the difference in value between two connected nodes. For example, and without limitation, supposing that the value of an employer node is F(e) and the value assigned to a member node is F(m). In this first example, the equation assigned to the edge connecting the employer node and the member node is $((F(e))-(F(m)))^2$. As another example, and without limitation, suppose that the value of a member node is F(m) and the value of an educational institution is F(i). In this second example, the equation assigned to the edge connecting the member node and the educational institution node is $((F(m))-(F(i)))^2$. Other equations for other edges are similarly defined.

To determine the values for nodes connected to the organization nodes 224, the graph analytic engine 214 employs one or more graph processing techniques. For example, the graph analytic engine 214 may use label propagation to determine the values of nodes connected, directly or indirectly, to the organization nodes 224. In one embodiment, the methodology for the label propagation is available as a function call provided by GraphX and/or Apache Spark™. After one or more iterations of the label propagation, the nodes are assigned a value based on the initial MCPE assigned to the organization nodes 224 and the equations assigned to corresponding edges of connected nodes. In this manner, the graph analytic engine 214 determines the values of nodes in a given graph when provided with an initial starting value for the organization nodes 224, such as the market capitalization or MCPE for a given organization.

Figure 9:
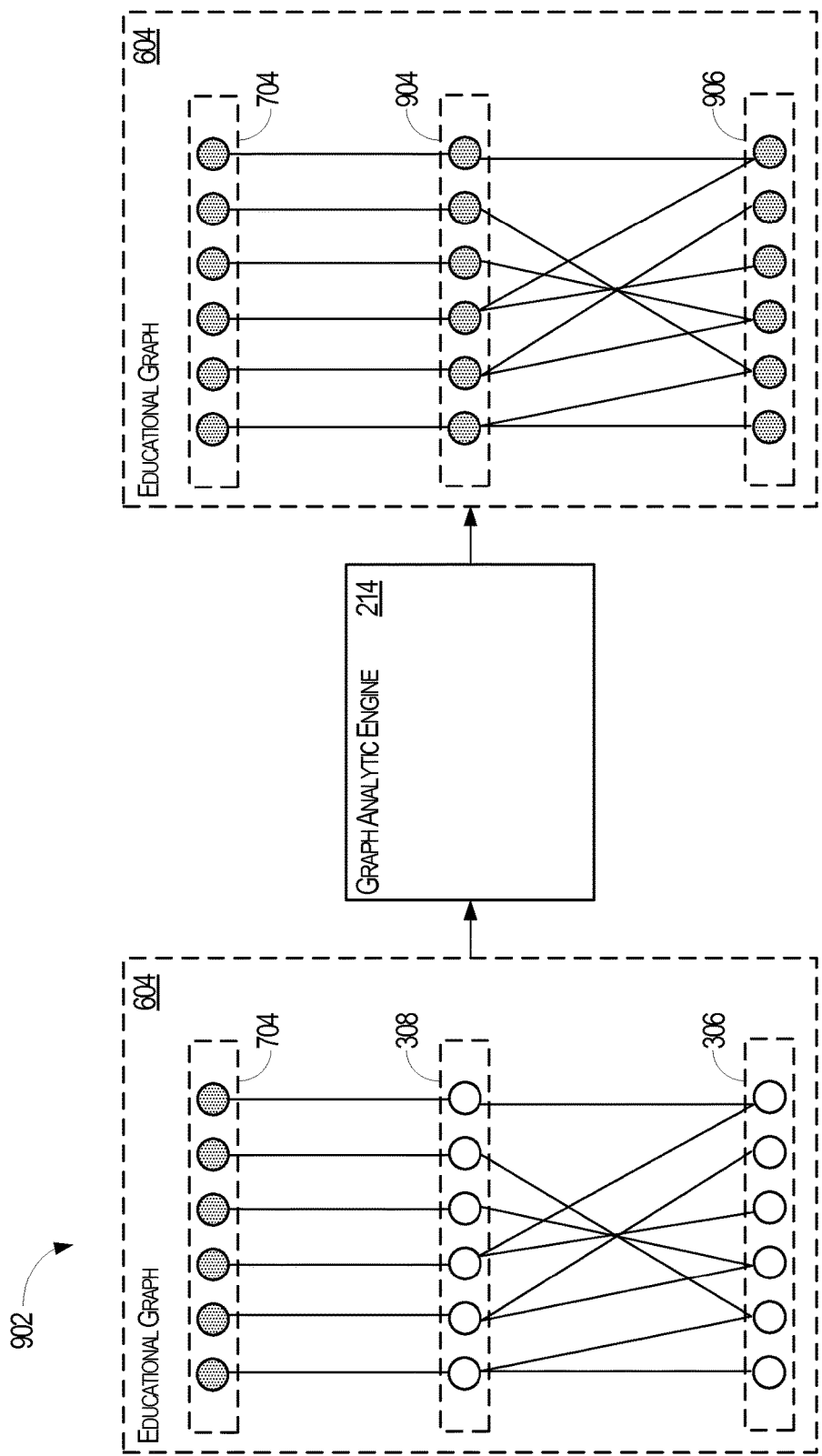
FIGS. 9-11 illustrate propagating values throughout the graphs constructed in FIGS. 4-6, in accordance with example embodiments.
Figure 10:
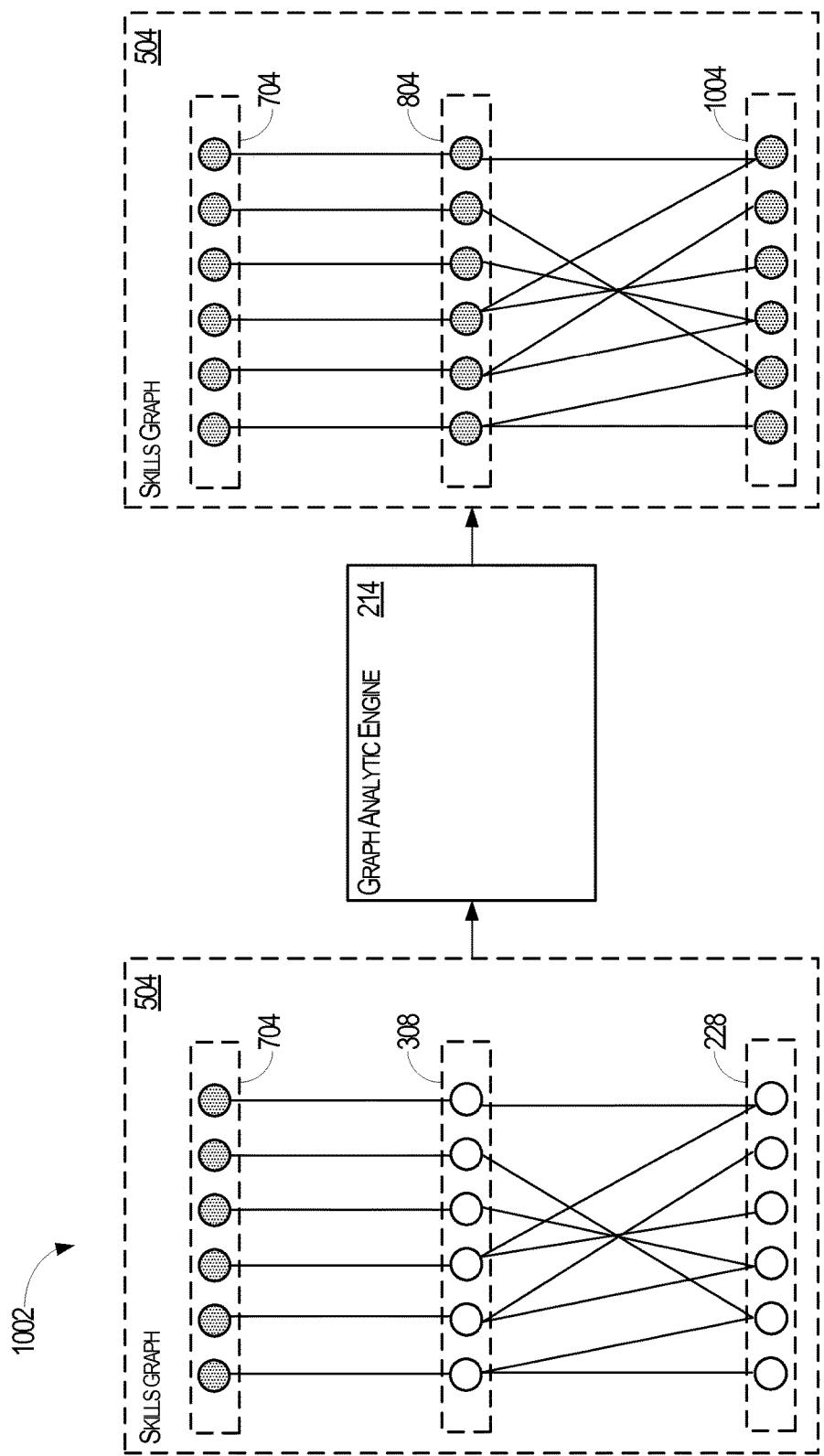
Figure 11:
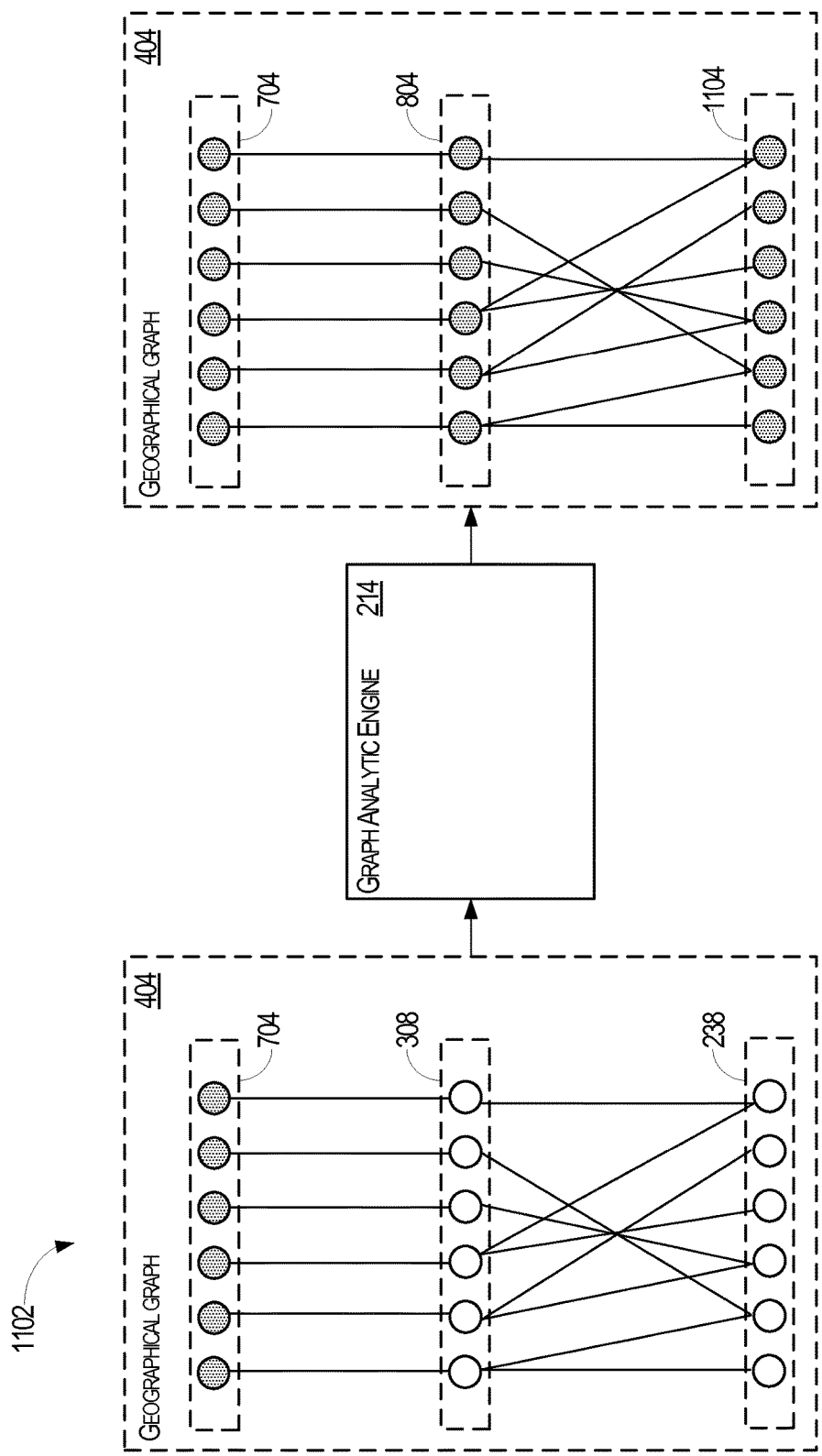

FIGS. 9-11 illustrate propagating values throughout the graphs constructed in FIGS. 4-6 in accordance with example embodiments. FIG. 9 illustrates an example embodiment 902 of the graph analytic engine applying label propagation to nodes of the educational graph 604. As shown in FIG. 9, the employer nodes 804 having assigned values are included in the educational graph 604. The nodes of the graph 604 and the connecting edges are then provided as input to the graph analytic engine 214. The graph analytic engine 214 then determines corresponding values for the member nodes 308 and educational institution nodes 306. As referenced in FIG. 9, the member nodes 308 having assigned values are shown as member nodes 904 and the educational institution nodes 306 having assigned values are shown as educational institution nodes 906. As discussed below, the values assigned to the educational nodes 906 are then used to rank educational institutions associated with the retrieved member profiles 222 and/or correlate educational institutions with one or more industries and/or skill sets.

FIG. 10 illustrates an example embodiment 902 of the graph analytic engine 214 applying label propagation to nodes of the skills graph 504. As shown in FIG. 10, the employer nodes 804 having assigned values are included in the skills graph 504. The nodes of the graph 504 and the connecting edges are then provided as input to the graph analytic engine 214. The graph analytic engine 214 then determines corresponding values for the member nodes 308 and skill nodes 228. As referenced in FIG. 10, the member nodes 308 having assigned values are shown as member nodes 904 and the skills nodes 228 having assigned values are shown as skills nodes 1004. As discussed below, the values assigned to the skills nodes 1004 are then used to skills associated with the retrieved member profiles 222 and/or correlate skills with other attributes (e.g., geographical attributes, educational attributes, etc.) extracted from the one or more retrieved member profiles 222.

As a last example, FIG. 11 illustrates an example embodiment 1102 of the graph analytic engine 214 applying label propagation to nodes of the geographical graph 404. As shown in FIG. 11, the employer nodes 804 having assigned values are included in the geographical graph 404. The nodes of the graph 404 and the connecting edges are then provided as input to the graph analytic engine 214. The graph analytic engine 214 then determines corresponding values for the member nodes 308 and geographical nodes 238. As referenced in FIG. 11, the member nodes 308 having assigned values are shown as member nodes 904 and the geographical nodes having assigned values are shown as geographical nodes 1104. As discussed below, the values assigned to the geographical nodes 1104 are then used to rank geographies associated with the retrieved member profiles 222 and/or correlate geographies with other attributes (e.g., skills attributes, educational institutions, etc.) extracted from the one or more retrieved member profiles 22.

Figure 12:
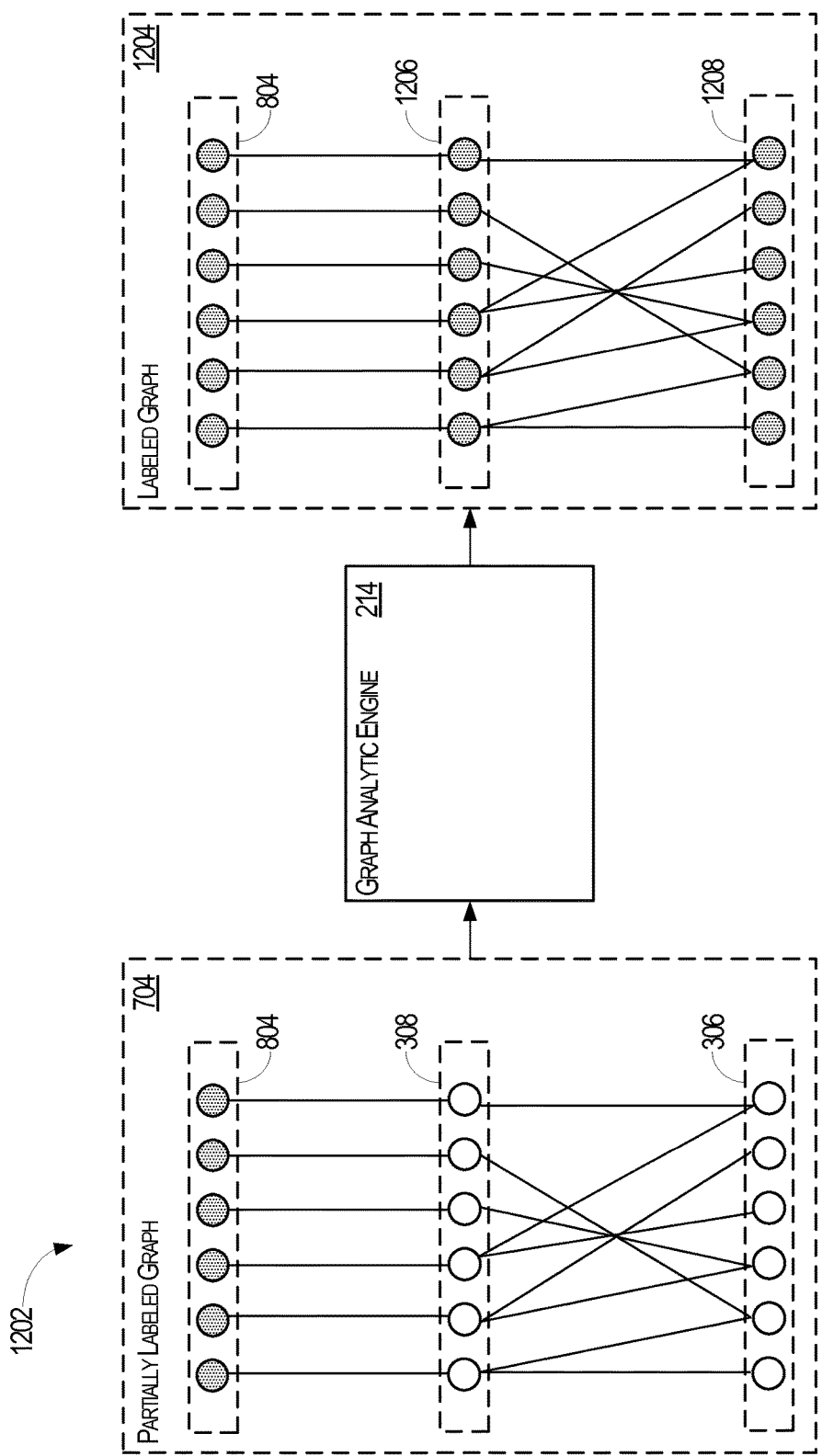
FIG. 12 illustrates propagating values from a partially labeled graph to obtain a labeled graph, in accordance with an example embodiment.

While FIGS. 9-11 illustrate that the graph analytic engine 214 operates on different types of graphs (e.g., graph 404, graph 504, and graph 604), one of ordinary skill in the art would understand that, in an alternative embodiment, the graph analytic engine 214 operates on additional or alternative graphs. For example, the graph analytic engine 214 may operate on a single graph. FIG. 12 illustrates propagating values from a partially labeled graph 704 to obtain a labeled graph 1204, in accordance with an example embodiment 1202. In the embodiment 1202 shown in FIG. 12, the partially labeled graph 704 includes the employer nodes 804, the member nodes 308, and the educational nodes 306. Furthermore, each of the nodes are associated with the value attribute, which, as discussed above with reference to FIG. 8, may be represented as the MCPE value determined for a corresponding employer node 804.

The graph 704 is considered "partially labeled" because a value has been assigned to the value attribute for the employer nodes 804, but has yet to be assigned to the value attribute for the member nodes 308 and educational nodes 306. Furthermore, and in this embodiment 1202, the employer nodes 704 are only connected by edges to the member nodes 308, whereas the member nodes are connected by edges to both the employer nodes 704 and the educational nodes 306. One of ordinary skill in the art will recognize that if additional types of nodes are to be included, such nodes may be connected via one or more edges to the member nodes 308. In this manner, the values initially assigned to the employer nodes (e.g., the MCPE) are preserved during label propagation, whereas the values assigned to the other types of nodes may change with each iteration of the label propagation.

By using one or more of the label propagation techniques previously discussed, the graph analytic engine 214 generates the labeled graph 1204. The graph 1204 is considered "labeled," because each of the nodes of the graph 1204 are associated with a non-null value attribute. In this regard, the member nodes 308 are transformed into the member nodes 1206 and the educational nodes 306 are transformed into the educational nodes 1208. By referencing the value attribute associated with a corresponding node, one can determine that nodes value. Furthermore, as a node is associated with other attributes (e.g., the member nodes 1206 are each associated with one or more skills attributes), the value attribute determined during label propagation can be used as a proxy to represent the value of such other attributes. As one example, the value attribute of a selected member node 1206 can be referenced to determine the value of the skills associated with the corresponding member. Similarly, the value attribute of a selected educational node 1208 can be referenced to determine the value of the corresponding educational institution. In this manner, the labeled graph 1204 illustrated in FIG. 12 can be used to determine the value of various attributes associated with corresponding nodes or the value of a node itself.

Figure 13:
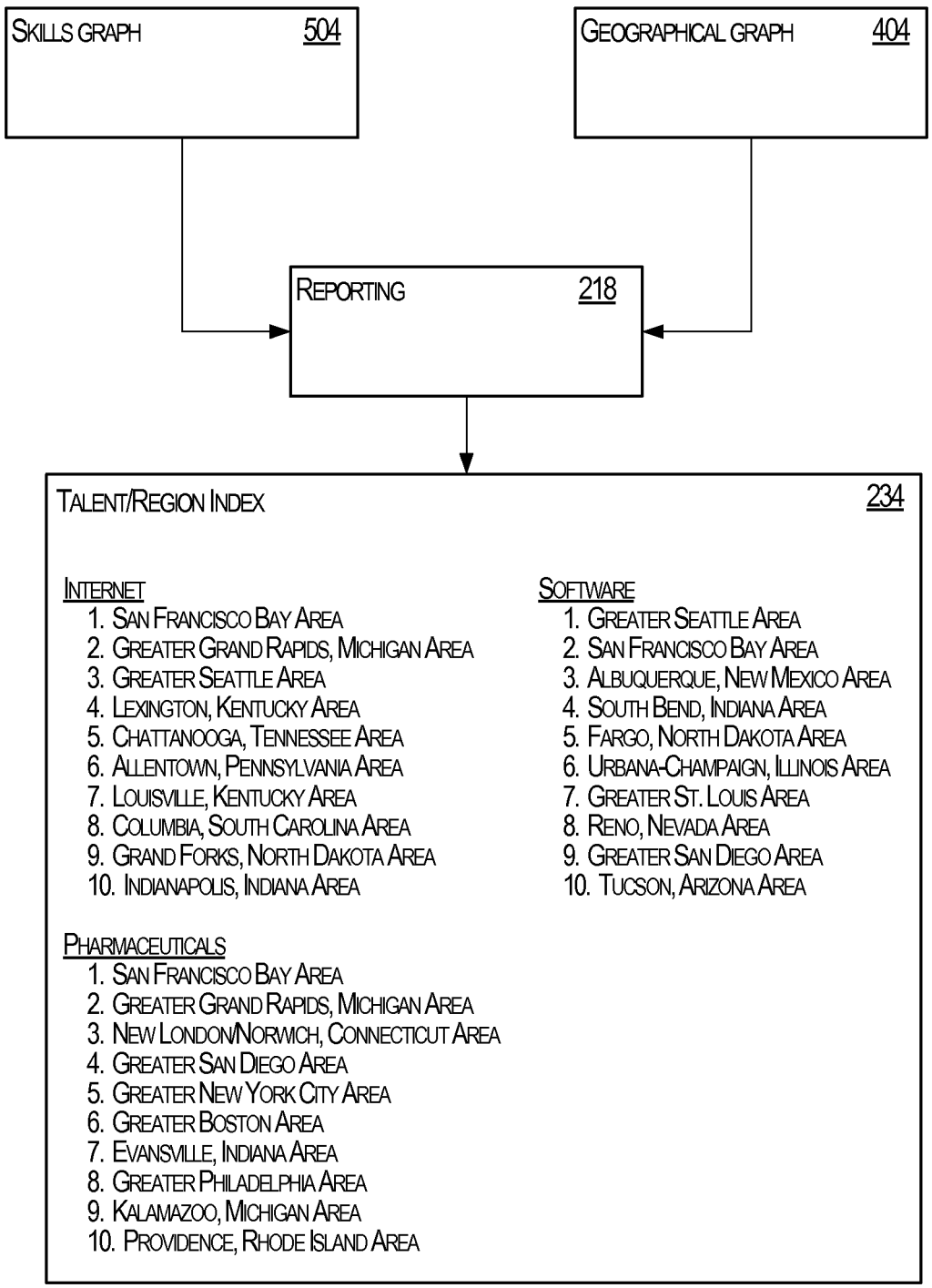
FIG. 13 illustrates a report, in accordance with an example embodiment, generated from the graphs of FIGS. 9-11.

Referring back to FIG. 2 and with reference to FIG. 13, the reporting module 218 is configured to generate one or more reporting indices 232 and provide such indices to the client device 104, via the user interface module 210, for display to the user 122 of the client device 104. In one embodiment, the reporting module 218 generates the reporting indices by aggregating specific sets of nodes, such as the skill nodes 1004, into predefined supersets, referencing the values assigned to the nodes of a given superset, and then correlating a given set of nodes with another set of aggregated nodes, such as the geographic nodes. In this example, where the supersets are aggregated skills nodes and aggregated geographic nodes, the resulting index is the talent/region index 234, which is illustrated as an example embodiment in FIG. 13.

As shown in FIG. 13, the skills graph 504 with the skills nodes 1004 and the geographical graph 404 with the geographical nodes 1004 are each provided as input to the reporting module 218. The reporting module 218 then clusters the various skills represented by the skills nodes 1004 into supersets. In one embodiment, such supersets may be created by having predefined associations between individual skills (e.g., "programming, "C++," "Java") and individual supersets (e.g., "Computers," "Logical Reasoning,",, and other such supersets). The reporting module 218 may be configured with, or reference one or more databases with, the various levels of superset granularities. At the least granular level, the skills superset may be referenced as an "industry." Similarly, the geographical nodes 1004 may each represent a specific geographical location (e.g., "San Jose, Calif."), and the reporting module 218 may be configured to reference predefined associations between individual geographical locations and geographical supersets to determine the geographical supersets represented by the geographical nodes 1104. At the least granular level, the geographical superset may be referenced as a "region," "state," "hemisphere," or other similar geographical term.

Having determined the supersets represented by the individual nodes (e.g., skills nodes 1004 and/or geographical nodes 1104), the reporting module 218 may then rank each superset. In one embodiment, the reporting module 218 ranks each superset by adding the values of the individual nodes that comprise the corresponding superset to arrive at a summed value corresponding to the superset. Alternatively, a weighting factor may be applied to one or more of the individual nodes and/or supersets to account for income bias and/or cost of living expenses.

In one embodiment, the user 122 selects the type of index to be generated by the reporting module 218. For example, the user 122 may select one or more skills supersets to be correlated with one or more geographical supersets via the user interface module 210. In this embodiment, the reporting module 218 ranks and correlates the various skills supersets and geographical supersets to generate the talent/region index 234. In the example shown in FIG. 13, the user 122 has selected the skill supersets of "Internet," "Software," and "Pharmaceuticals," to be included in the talent/region index 234. The talent/region index 234 thus shows which geographical regions are the "best" regions for the skills selected by the user. determined geographical supersets and the skills supersets, correlating each superset, and then ranking the geographical supersets. In an alternative embodiment, the reporting module 218 is preconfigured with the indices to generate, such as the talent/region index 234 and/or the skills index 236, which the user 122 may request to view via the client device 104. In this alternative embodiment, the reporting indices 232 include many different types of indices, where each index is associated with different attribute supersets (e.g., skills, geographies, educational institutions, employers, etc.).

Figure 14A:
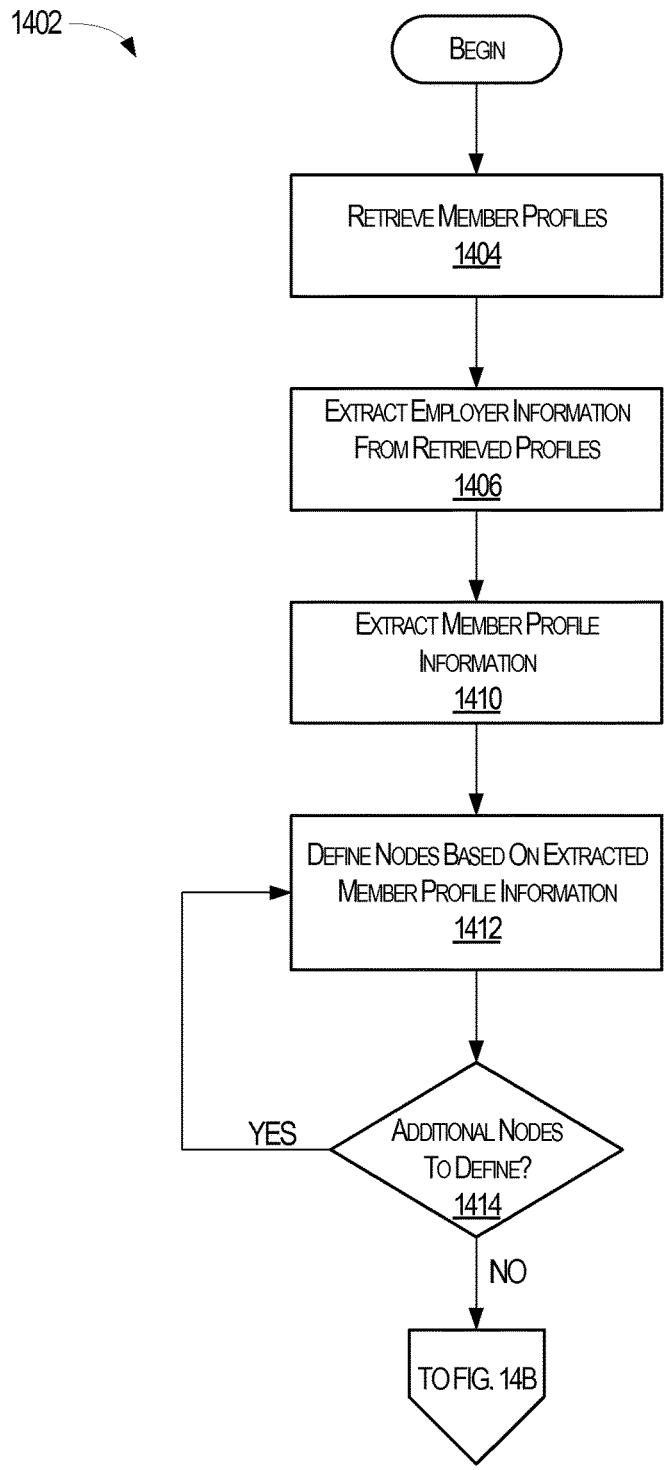
FIGS. 14A-14B illustrate a method, according to an example embodiment, for constructing various graphs and generated reports therefrom.
Figure 14B:
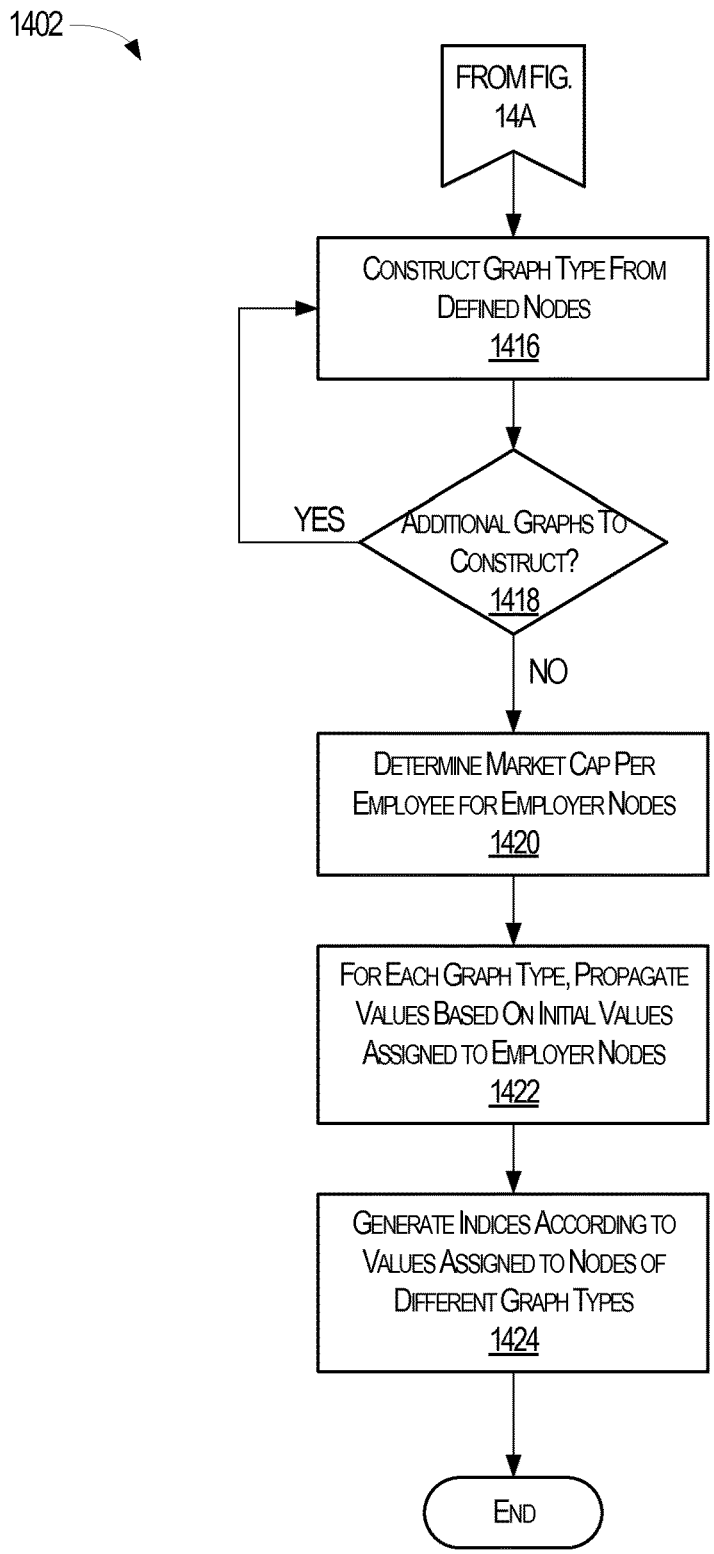

FIGS. 14A-14B illustrate a method 1402, according to an example embodiment, for constructing various graphs and generated reports therefrom. One or more of the modules 208 may implement the method 1402, which is discussed by way of reference thereto. Referring first to FIG. 14A, the social networking server 112 retrieves one or more member profiles from the member profile database 120 (Operation 1404). As discussed previously, and in one embodiment, the retrieved member profiles are stored as the retrieved member profiles 222. Thereafter, the social networking server 112 extracts various attributes associated with one or more retrieved member profiles 222. In one embodiment, the data processing engine 212 is configured to extract employer information associated with a given member including, but not limited to, a current employer, one or more previous employers, one or more locations where the given member was employed, one or more locations where the given member is currently employed, and other such employment information (Operation 1406). The data processing engine 212 then extracts other attributes from one or more of the retrieved member profiles 222, such as one or more geographical locations, one or more skills, one or more educational institutions (e.g., currently attended and/or previously attended institutions), and other such attributes or combination of attributes (Operation 1410).

The social networking server 112 then defines nodes corresponding to the extract attributes. In one embodiment, the graph construction module 216 defines one or more nodes for each of the extracted attributes (Operation 1412).

As each node is defined, the graph construction module 216 determines whether there are remaining attributes to define as nodes (Operation 1414). If answered in the affirmative (e.g., "Yes" branch of Operation 1414), the graph construction module 216 defines the node corresponding to the next attribute to be processed. If answered in the nugatory (e.g., "No" branch of Operation 1414), the method 1402 proceeds to Operation 1416.

At Operation 1416, and in one embodiment, the graph construction module 216 constructs one or more graph types corresponding to one or more types of the extracted attributes (Operation 1416). As discussed previously, the graph construction module 216 may construct graph types for nodes including, but not limited to, skills nodes 228, educational nodes 306, geographical nodes 238, and other such nodes or combination of nodes. After each graph type is constructed, the graph construction module 216 may determine whether there are remaining graphs to construct (Operation 1418). If this determination is made in the affirmative (e.g., "Yes" branch of Operation 1418), the graph construction module 216 constructs a graph for the next type of nodes. If this determination is made in the nugatory (e.g., "No" branch of Operation 1418), then the method 1402 proceeds to Operation 1420.

As discussed previously, when the nodes are initially defined, one or more nodes, such as the employer nodes 304, may lack an assigned value. In one embodiment, the MCPE for each employer is used as the value to assign to its corresponding node. Accordingly, in one embodiment, the MCPE may be first determined (Operation 1420). As discussed above, the MCPE for each employer may be determined from market capitalization data 220 obtained from one or more sources, or combination of sources, of market capitalization data. In an alternative embodiment, the MCPE for each employer is already determined and included in the market capitalization data 220. Thereafter, the graph analytic engine 214 assigns the determined (or provided) MCPE values to each of the employer nodes (e.g., employer nodes 304), which become the employer nodes 804.

Having assigned values to the employer nodes, the method 1402 then proceeds to assign values to nodes connected, directly or indirectly, to the employer nodes. Accordingly, in one embodiment, for each graph type previously constructed, the graph analytic engine 214 performs an iterative label propagation on the nodes for a selected graph (Operation 1422). Alternatively, and as also discussed, the graph construction module 216 may construct a single graph, in which case, the graph analytic engine 214 performs the iterative label propagation on the nodes of the single graph.

Once the values for the various nodes have been determined and assigned, the reporting module 218 may then be instructed to generate one or more reporting indices 232 for display by the client device 104 (Operation 1424). As discussed above, the reporting module 218 may receive a selection of one or more attributes (or representative supersets) for inclusion in the report. Alternatively, the reporting module 218 may be preconfigured to generate one or more indices based on specific attributes. In addition, and as also explained above, the reporting module 218 may generate the various indices 232 by assigning a group value (e.g., a summed and/or weighted value) to supersets of selected nodes, which are then ranked accordingly. As explained above, an example of the talent/region index 234 is illustrated in FIG. 13.

In this manner, the disclosed systems and methods provide meaningful interpretations of information that would otherwise be overlooked or disregarded. Furthermore, the disclosed systems and methods leverage various technical and complex modules to provide these meaningful interpretations, such as those modules and engines found in the space of graph theory, graph processing, and data processing. In addition, the disclosed systems and methods go beyond the mere application of a mathematical equation or algorithm but, instead, take real-world data provided by real individuals, employers, educational institutions, and transforms that data into meaningful visualizations that provide structure and correlations that would have otherwise gone unnoticed. One of the many benefits of the disclosed systems and methods is that state policymakers, city planners, and entrepreneurs can use this tool to formulate policies that help foster growth in a region, which has real-world implications, both socially and economically.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-14B are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Example Machine Architecture and Machine-Readable Medium

Figure 15:
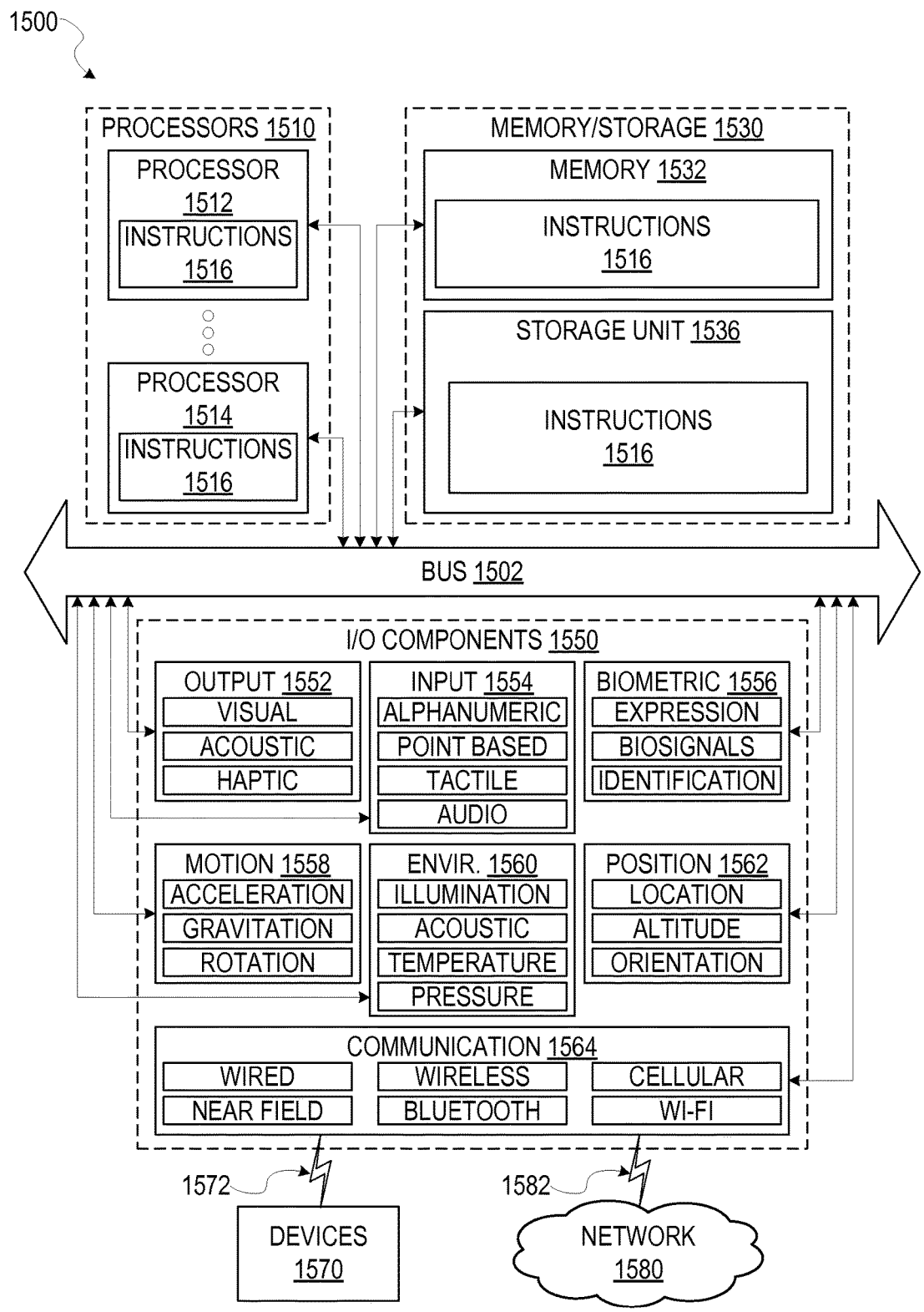
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. For example the instructions may cause the machine to execute the flow diagrams of FIGS. 14A-14B. Additionally, or alternatively, the instructions may implement one or more of the components of FIG. 2. The instructions transform the general, non-programmed machine into a particular machine programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a personal digital assistant (PDA), or any machine capable of executing the instructions 1516, sequentially or otherwise, that specify actions to be taken by machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory 1530, and I/O components 1550, which may be configured to communicate with each other such as via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1512 and processor 1514 that may execute instructions 1516. The term "processor" is intended to include multi-core processor that may comprise two or more independent processors (sometimes referred to as "cores") that may execute instructions contemporaneously. Although FIG. 15 shows multiple processors, the machine 1500 may include a single processor with a single core, a single processor with multiple cores (e.g., a multi-core process), multiple processors with a single core, multiple processors with multiples cores, or any combination thereof.

The memory/storage 1530 may include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 may also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of processors 1510 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1550 may include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environmental components 1560, or position components 1562 among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via coupling 1582 and coupling 1572 respectively. For example, the communication components 1564 may include a network interface component or other suitable device to interface with the network 1580. In further examples, communication components 1564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a Universal Serial Bus (USB)).

Moreover, the communication components 1564 may detect identifiers or include components operable to detect identifiers. For example, the communication components 1564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF413, Ultra Code, UCC RSS-2D bar code, and other optical codes), or acoustic detection components (e.g., microphones to identify tagged audio signals). In addition, a variety of information may be derived via the communication components 1564, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1580 or a portion of the network 1580 may include a wireless or cellular network and the coupling 1582 may be a Code Division Multiple Access (CDMA) connection, a Global System for Mobile communications (GSM) connection, or other type of cellular or wireless coupling. In this example, the coupling 1582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., hypertext transfer protocol (HTTP)). Similarly, the instructions 1516 may be transmitted or received using a transmission medium via the coupling 1572 (e.g., a peer-to-peer coupling) to devices 1570. The term "transmission medium" shall be taken to include any intangible medium that is capable of storing, encoding, or carrying instructions 1516 for execution by the machine 1500, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
   a machine-readable medium storing computer-executable instructions; and
   at least one hardware processor communicatively coupled to the machine-readable medium that, when the computer-executable instructions are executed, the at least one hardware processor is configured to:
   extract a first plurality of attributes from a plurality of member profiles of a social networking service, each member profile including a second plurality of attributes, where each attribute is a characteristic of a member corresponding to the member profile;
   define a plurality of nodes corresponding to each attribute of the first plurality of attributes;
   assign a first plurality of values to a first subset of the plurality of nodes, each node of the first subset being assigned a corresponding value;
   determine a second plurality of values for a second subset of the plurality of nodes, wherein:
      each node of the second subset is associated with at least one edge connecting the node with at least one other node, wherein the at least one edge is associated with a corresponding propagation equation;

the second plurality of values are determined through a graph propagation technique using the first plurality of values and the corresponding propagation equation associated with a node selected from the second subset; and each node of the second subset is associated with a corresponding value selected from the second plurality of values;

determine a third plurality of values for a third subset of the plurality of nodes, wherein:

each node of the third subset of the plurality of nodes is associated with a determined value of the third plurality of values;

the third plurality of values are determined based on the first plurality of values;

correlate one or more nodes from the third subset of nodes with one or more nodes from the second subset of nodes;

generate an index that includes:

the correlation between the one or more nodes of the third subset of nodes with one or more nodes from the second subset of nodes; and a ranking of at least one attribute corresponding to a node selected from the second subset of the plurality of nodes, the ranking being based on the value assigned to the node corresponding to the at least one attribute; and provide the index for display by a client device in communication with the at least one hardware processor.

2. The system of claim 1, wherein the nodes of the first subset of the plurality of nodes each correspond to an employer of one or more members associated with the plurality of member profiles.

3. The system of claim 1, wherein:

the first subset of the plurality of nodes correspond to a first type of attribute selected from the first plurality of attributes;

the second subset of the plurality of nodes correspond to a second type of attribute selected from the first plurality of attributes; and the first type of attribute is different than the second type of attribute.

4. The system of claim 1, wherein the second plurality of values are further determined based on at least one constraint corresponding to at least one edge connecting at least one node selected from second subset of the plurality of nodes with at least one node selected from the first subset of the plurality of nodes.

5. The system of claim 1, wherein the at least one hardware processor is further configured to define a plurality of edges connecting the first subset of nodes, the second subset of nodes, and the third subset of nodes based on the type of attribute corresponding to the nodes selected from a given subset.

6. The system of claim 1, wherein the at least one hardware processor is further configured to receive an input from the client device identifying which of the attributes from the second plurality of attributes are to be extracted as the first plurality of attributes.

7. A method comprising:

extracting, by at least one hardware processor, a first plurality of attributes from a plurality of member profiles of a social networking service, each member profile including a second plurality of attributes, where each attribute is a characteristic of a member corresponding to the member profile;

defining a plurality of nodes corresponding to each attribute of the first plurality of attributes;

assigning a first plurality of values to a first subset of the plurality of nodes, each node of the first subset being assigned a corresponding value;

determining a second plurality of values for a second subset of the plurality of nodes, wherein:

each node of the second subset is associated with at least one edge connecting the node with at least one other node, wherein the at least one edge is associated with a corresponding propagation equation;

the second plurality of values are determined through a graph propagation technique using the first plurality of values and the corresponding propagation equation associated with a node selected from the second subset; and each node of the second subset is associated with a corresponding value selected from the second plurality of values;

determining a third plurality of values for a third subset of the plurality of nodes, wherein:

each node of the third subset is associated with a determined value selected from the third plurality of values; and the third plurality of values are determined based on the first plurality of values;

correlating one or more nodes of the third subset of nodes with one or more nodes of the second subset of nodes;

generating an index that includes:

the correlation between the one or more nodes of the third subset of nodes with the one or more nodes of the second subset of nodes; and a ranking of at least one attribute corresponding to a node selected from the second subset of the plurality of nodes, the ranking being based on the value assigned to the node corresponding to the at least one attribute; and providing the index for display by a client device in communication with the at least one hardware processor.

8. The method of claim 7, wherein the nodes of the first subset of the plurality of nodes each correspond to an employer of one or more members associated with the plurality of member profiles.

9. The method of claim 7 wherein:

the first subset of the plurality of nodes correspond to a first type of attribute selected from the first plurality of attributes;

the second subset of the plurality of nodes correspond to a second type of attribute selected from the first plurality of attributes; and the first type of attribute is different than the second type of attribute.

10. The method of claim 7, wherein the second plurality of values are further determined based on at least one constraint corresponding to at least one edge connecting at least one node selected from second subset of the plurality of nodes with at least one node selected from the first subset of the plurality of nodes.

11. The method of claim 7, further comprising:

defining a plurality of edges connecting the first subset of nodes, the second subset of nodes, and the third subset of nodes based on the type of attribute corresponding to the nodes selected from a given subset.

12. The method of claim 7, further comprising:
receiving an input from a client device that identifies which of the attributes from the second plurality of attributes are to be extracted as the first plurality of attributes;
providing the index for display by a client device in communication with the at least one hardware processor.

13. A machine-readable medium storing computer-executable instructions thereon that, when executed by at least one hardware processor, cause the at least one hardware processor to perform a plurality of operations, the plurality operations comprising:
extracting a first plurality of attributes from a plurality of member profiles of a social networking service, each member profile including a second plurality of attributes, where each attribute is a characteristic of a member corresponding to the member profile;
defining a plurality of nodes corresponding to each attribute of the first plurality of attributes;
assigning a first plurality of values to a first subset of the plurality of nodes, each node of the first subset being assigned a corresponding value;
determining a second plurality of values for a second subset of the plurality of nodes, wherein:
each node of the second subset is associated with a determined value selected from the second plurality of values; and
the second plurality of values are determined based on the first plurality of values;
determining a third plurality of values for a third subset of the plurality of nodes, wherein:
each node of the third subset is associated with a determined value selected from the third plurality of values; and
the third plurality of values are determined based on the first plurality of values;
correlating one or more nodes of the third subset of nodes with one or more nodes of the second subset of nodes;
generating an index that includes:
the correlation between the one or more nodes of the third subset of nodes with the one or more nodes of the second subset of nodes; and
a ranking of at least one attribute corresponding to a node selected from the second subset of the plurality of nodes, the ranking being based on the value assigned to the node corresponding to the at least one attribute; and
providing the index for display by a client device in communication with the at least one hardware processor.

14. The machine-readable medium of claim 13, wherein the nodes of the first subset of the plurality of nodes each correspond to an employer of one or more members associated with the plurality of member profiles.

15. The machine-readable medium of claim 13, wherein:
the first subset of the plurality of nodes correspond to a first type of attribute selected from the first plurality of attributes;
the second subset of the plurality of nodes correspond to a second type of attribute selected from the first plurality of attributes; and
the first type of attribute is different than the second type of attribute.

16. The machine-readable medium of claim 13, wherein the second plurality of values are further determined based on at least one constraint corresponding to at least one edge connecting at least one node selected from second subset of the plurality of nodes with at least one node selected from the first subset of the plurality of nodes.

17. The machine-readable medium of claim 13, wherein the plurality of operations further comprise defining a plurality of edges connecting the first subset of nodes, the second subset of nodes, and the third subset of nodes based on the type of attribute corresponding to the nodes selected from a given subset.

* * * * *